(12) United States Patent
Combs et al.

(10) Patent No.: US 12,288,072 B2
(45) Date of Patent: Apr. 29, 2025

(54) METHODS, SYSTEMS, AND APPARATUSES FOR PRECISE LAST BRANCH RECORD EVENT LOGGING

(71) Applicant: Intel Corporation, Santa Clara, CA (US)

(72) Inventors: Jonathan Combs, Austin, TX (US); Michael Chynoweth, Placitas, NM (US); Beeman Strong, Portland, OR (US); Charlie Hewett, Bellevue, WA (US); Patrick Konsor, Hillsboro, OR (US); Vidisha Chirra, Austin, TX (US); Asavari Paranjape, Austin, TX (US); Ahmad Yasin, Haifa (IL)

( * ) Notice: Subject to any disclaimer, the term of this patent is extended or adjusted under 35 U.S.C. 154(b) by 779 days.

(21) Appl. No.: 17/214,823

(22) Filed: Mar. 27, 2021

(65) Prior Publication Data

US 2022/0308882 A1  Sep. 29, 2022

(51) Int. Cl.
| | |
|---|---|
| G06F 11/34 | (2006.01) |
| G06F 9/38 | (2018.01) |
| G06F 11/30 | (2006.01) |
| G06F 12/0802 | (2016.01) |
| G06F 17/40 | (2006.01) |

(52) U.S. Cl.
CPC ........ G06F 9/3804 (2013.01); G06F 11/3024 (2013.01); G06F 11/3495 (2013.01); G06F 12/0802 (2013.01); G06F 2212/30 (2013.01)

(58) Field of Classification Search
None
See application file for complete search history.

(56) References Cited

U.S. PATENT DOCUMENTS

| | | | |
|---|---|---|---|
| 6,233,679 B1 * | 5/2001 | Holmberg | G06F 9/3846 |
| | | | 712/240 |
| 9,384,003 B2 | 7/2016 | Mizuno et al. | |
| 10,452,417 B2 * | 10/2019 | Serebrin | G06F 9/45558 |
| 11,789,735 B2 * | 10/2023 | Shanbhogue | G06F 9/3858 |
| | | | 726/16 |

(Continued)

OTHER PUBLICATIONS

Andi Kleen, "An introduction to last branch records", Mar. 23, 2016, LWN.net (Year: 2016).*

(Continued)

*Primary Examiner* — Hyun Nam
(74) *Attorney, Agent, or Firm* — NICHOLSON DE VOS WEBSTER & ELLIOTT LLP

(57) ABSTRACT

Systems, methods, and apparatuses relating to circuitry to implement precise last branch record event logging in a processor are described. In one embodiment, a hardware processor core includes an execution circuit to execute instructions, a retirement circuit to retire executed instructions, a status register, and a last branch record circuit to, in response to retirement by the retirement circuit of a first taken branch instruction, start a cycle timer and a performance monitoring event counter, and in response to retirement by the retirement circuit of a second taken branch instruction, that is a next taken branch instruction in program order after the first taken branch instruction, write values from the cycle timer and the performance monitoring event counter into a first entry in the status register and clear the values from the cycle timer and the performance monitoring event counter.

24 Claims, 16 Drawing Sheets

(56) References Cited

U.S. PATENT DOCUMENTS

| | | | |
|---|---|---|---|
| 2004/0107058 A1* | 6/2004 | Gomes | G01R 31/31932 702/31 |
| 2007/0214342 A1* | 9/2007 | Newburn | G06F 11/3612 712/216 |
| 2009/0210814 A1* | 8/2009 | Agrusa | G05B 23/0267 700/83 |
| 2012/0304779 A1* | 12/2012 | Ono | G01F 1/075 73/861.08 |
| 2012/0311307 A1* | 12/2012 | Chynoweth | G06F 11/348 712/234 |
| 2014/0380027 A1* | 12/2014 | Yasin | G06F 9/30098 712/240 |
| 2016/0259646 A1* | 9/2016 | Yasin | G06F 11/3419 |
| 2017/0083333 A1* | 3/2017 | Choudhary | G06F 9/30058 |
| 2018/0217839 A1 | 8/2018 | Chynoweth et al. | |
| 2019/0034206 A1* | 1/2019 | Sane | G06F 11/3466 |
| 2020/0310957 A1* | 10/2020 | Sane | G06F 11/3024 |
| 2021/0200547 A1* | 7/2021 | Yasin | G06F 9/544 |
| 2021/0342134 A1* | 11/2021 | Yasin | G06F 8/4442 |
| 2022/0308882 A1* | 9/2022 | Combs | G06F 11/3024 |

OTHER PUBLICATIONS

Andy Kleen, "Advanced usage of last branch records", Mar. 30, 2016, LWN.net (Year: 2016).*

Intel, "Intel(registered) 64 and IA-32 Architectures Software Developer's Manual", vol. 3B: System Programming Guide, Part 2, Order No. 253669-060US, Sep. 2016, 582 pages.

Weidmann, Martin, "Arm Architecture 2020 Extensions", Linaro Connect Sep. 2020, Arm Limited, 2020, 21 pages.

International Search Report and Written Opinion, PCT App. No. PCT/US22/13415, Apr. 25, 2022, 12 pages.

Extended European search report and Search Opinion, EP App. No. 22781798.8, Feb. 18, 2025, 08 pages.

* cited by examiner

DATA REGISTER(S) 156B

| CPUID.(EAX=01CH, ECX=0): Register | Bits | Name | Description/Behavior |
|---|---|---|---|
| EAX | 7:0 | Supported LBR depth values | For each bit n set in this field, the IA32_LBR_DEPTH.DEPTH value 8*(n+1) is supported. |
| | 29:8 | Reserved | |
| | 30 | Deep C-state Reset | If set, indicates that LBRs may be cleared on an MWAIT that requests a C-state numerically greater than C1. |
| | 31 | IP values contain LIP | If set, LBR IP values contain LIP. If clear, IP values contain EIP. |
| EBX | 0 | CPL Filtering Supported | If set, the processor supports setting IA32_LBR_CTL[1:0] to non-zero value. |
| | 1 | Branch Filtering Supported | If set, the processor supports setting IA32_LBR_CTL[16] to non-zero value. |
| | 2 | Call-stack Mode Supported | If set, the processor supports setting IA32_LBR_CTL[3] to 1. |
| | 31:3 | Reserved | |
| ECX | 0 | Mispredict Bit Supported | IA32_LBR_x_INFO[63] holds indication of branch misprediction (MISPRED). |
| | 1 | Timed LBRs Supported | IA32_LBR_x_INFO[15:0] holds CPU cycles since last LBR entry (CYC_CNT), and IA32_LBR_x_INFO[60] holds an indication of whether the value field is valid. (CYC_CNT_VALID) |
| | 2 | Branch Type Field Supported | IA32_LBR_INFO_x[59:56] holds indication of the recorded operation's branch type. (BR_TYPE). |
| | 15:2 | Reserved | |
| | 19:16 | PMC[0..3] Event Logging Supported | IA32_PERFEVTSEL[0..3].EN_LBR_LOG can be set to 1, which enabled logging of PMC[0..3] event occurrences in IA32_LBR_INFO_x.PMC[0..3]_CNT. |
| | 31:20 | Reserved | |
| EDX | 31:0 | Reserved | |

PSEUDOCODE BLOCK 600

3AE0: PUSH RBP
3AE1: MOV RBP, RSP
3AE4: PUSH R15
3AE6: PUSH R14
3AE8: PUSH RBX
3AE9: PUSH RAX
3AEA: MOV RBX, QWORD PTR [RDI+28]
3AEE: MOV R15, QWORD PTR [RDI+30]
3AF2: MOV R14D, 1
3AF8: CMP RBX, R15
602 → 3AFB: JZ 3B14

FIG. 6

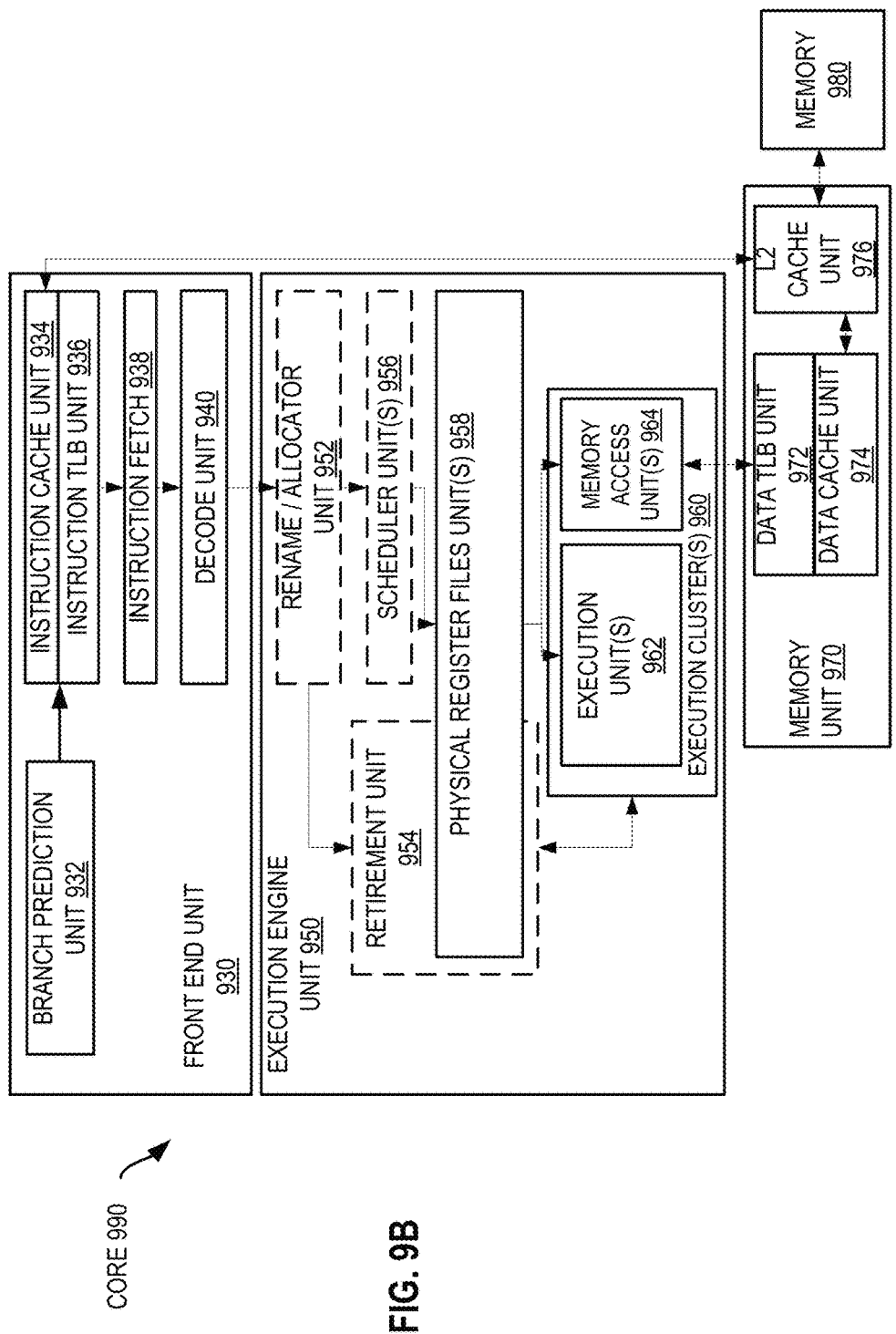
FIG. 9A
FIG. 9B

METHODS, SYSTEMS, AND APPARATUSES FOR PRECISE LAST BRANCH RECORD EVENT LOGGING

TECHNICAL FIELD

The disclosure relates generally to electronics, and, more specifically, an embodiment of the disclosure relates to circuitry to implement precise last branch record event logging in a processor.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3 illustrates last branch record capabilities written into data register(s) according to embodiments of the disclosure.

FIG. 6 illustrates a pseudocode block according to embodiments of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
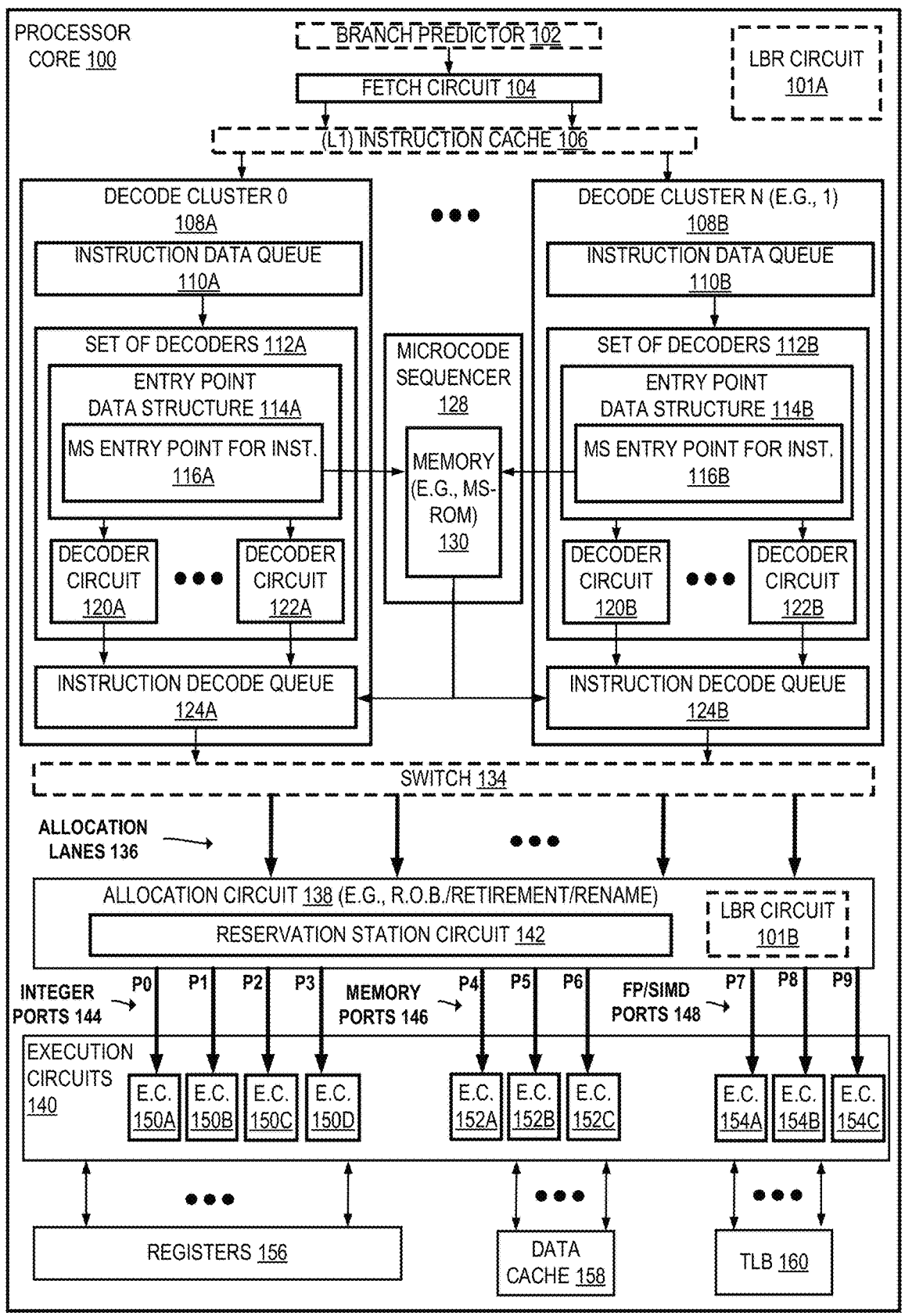
FIG. 1 illustrates a processor core having a last branch record circuit according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute (e.g., user-level) instructions (e.g., a thread of instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain embodiments, a processor includes circuitry (e.g., one or more decoder circuits) to translate (e.g., decode) an instruction into one or more micro-operations (μops or micro-ops), for example, with these micro-operations directly executed by the hardware (e.g., by execution circuits), e.g., and then the macro-operation retired once the micro-operation(s) are complete. One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one embodiment, the instructions are 64 bit and/or 32 bit instructions of an instruction set architecture (ISA). In one embodiment, the instructions are (e.g., 64 bit and/or 32 bit) instructions of an Intel® instruction set architecture (ISA).

One of the most challenging tasks in software performance analysis is to attribute microarchitectural performance issues across bottlenecks in segments of code. It may be desirable for users to move away from coarse-grained, expensive, intrusive, and inaccurate instrumentation to timing code segments, and instead turn to a low-intrusion, accurate elapsed cycle timer in a last branch records (LBRs), e.g., as discussed herein. In certain embodiments, this timing capability is very valuable for finding low-level performance issues, e.g., due to its sub-nanosecond granularity. In certain embodiments, the last branch records contain the taken branch information filterable by the "type" of branch, for example, caused by execution of jump ("JMP"), jump if condition is met ("Jcc"), loop ("LOOP"), loop if condition is met ("LOOPcc"), or call ("CALL") instructions.

In certain embodiments, a Jcc instruction checks the state of one or more of the status flags in a (e.g., EFLAGS) register (e.g., CF, OF, PF, SF, and ZF) and, if the flags are in the specified state (condition), performs a jump to the target instruction specified by the destination operand (e.g., target address). For example, where a condition code (cc) is associated with each instruction to indicate the condition being tested for, e.g., if the condition is not satisfied, the jump is not performed and execution continues with the instruction following the Jcc instruction. In certain embodiments, a LOOP instruction performs a loop operation using a register (e.g., RCX, ECX, or CX register) as a counter for each iteration. Some forms of a loop instruction (LOOPcc) accept flags (e.g., ZF flag as a condition for terminating the loop before the count reaches zero. In certain embodiments, a call instruction saves procedure linking information on the stack and branches to the called procedure specified using the target operand, e.g., where the target operand specifies the address of the first instruction in the called procedure. The operand can be an immediate value, a general-purpose register, or a memory location.

In certain embodiments (e.g., without filters), the last branch record circuit will capture every taken branch of control flow and the timing between contiguously executed portions of code (e.g., code between a pair of taken branches). In one embodiment, a processor can sample on performance monitoring events simultaneously with collecting last branch records, but due to separate sampling rates it is difficult to attribute events to higher or lower times across a segment of code.

Embodiments herein uses LBR event logging to augment LBR performance monitoring capability, e.g., by adding per-counter indication of event occurrences for each and every timed LBR entry showing what event(s) occurred in the segment between the target and the next control flow change (e.g., between a first taken branch and a next (e.g., in program order) taken branch in code execution).

Timed LBR capability may be used to collect and analyze cycle accurate timings on portions of code between branch entries, but there may be groupings of timings (e.g., timings with higher cycle count) which cannot be accurately explained, for example, collecting performance monitoring events along with timed LBR, which results in a "best guess" to explain each specific timing result using the microarchitectural events that occur. For example, performance monitoring event-based sampling data can be collected in parallel with timed LBR data which can potentially provide some data-driven guesses into the attribution of specific LBR timings. Since the estimates are not in direct 1:1 correlation with the specific timings, it often results in an inability to explain any individual timing result with any certainty. Embodiments herein provide event logging capability to last branch record circuits, e.g., adding a per-counter indication of precise event occurrences in LBR data. This data may include the incremented event count (e.g., indicating 0, 1, 2, or 3+(e.g., saturation) times an event happened with two bits per counter, but can be extended with further bits). In certain embodiments, the counter values (e.g., bits) provide a direct way of attributing exact timed LBR latencies (e.g., in clock cycles) to their corresponding performance monitoring events and give a direct indication to any micro-architectural issues which were occurring during the timed code segment.

Certain users may have difficulties in understanding spikes in a timed LBR cycle count, where their analysis mechanisms (e.g., performance monitoring metrics and formulas such as top-down methodology analysis (TMA)) can only associate a fixed cost that may not be entirely exposed with individual events. Embodiments herein of LBR event logging provide a way to directly attribute exposed retirement latency to combinations of events across a block of instructions, e.g., and can also leverage machine learning to discover advanced performance insights that would not otherwise be possible. Embodiments herein generate more accurate and actionable performance insights including root causes for specific issues in code segments with significantly lower effort and time requirements than other methods.

FIG. 1 illustrates a processor core 100 having a last branch record circuit (101A or 101B) according to embodiments of the disclosure. The last branch record circuit may be anywhere within a processor or computing system, for example, as a separate component at 101A or within allocation circuit 138 at 101B. In one embodiment, a last branch record circuit is within a re-order buffer (ROB). In one embodiment, a last branch record circuit maintains separate records (e.g., in separate machine specific registers (MSRs)) for each logical processor (e.g., logical central processing unit (logical CPU)). In one embodiment, LBR stack (e.g., registers) are separate from any debug registers (e.g., DR0, DR1, DR2, DR3, DR6, and DR7).

In certain embodiments, the last branch recording mechanism (e.g., last branch record circuit) tracks not only branch instructions (e.g., JMP, Jcc, LOOP, CALL, etc.), but also other operations that cause a change in the instruction pointer (e.g., external interrupts, traps, and/or faults). In certain embodiments, the last branch recording mechanism (e.g., last branch record circuit) employs a set of MSRs, e.g., referred to as last branch record (LBR) stack. The size and exact locations of the LBR stack may be model (e.g., processor) specific. In one embodiment, the LBR MSRs are 64-bits wide, although other bit widths may be utilized. For example, where the MSRs are wide enough to store a full address (e.g., or instruction pointer).

In certain embodiments, each LBR stack entry consists of three MSRs: (i) MSR_LASTBRANCH_x_FROM_IP (e.g., as in Table 1 below), MSR_LASTBRANCH_x_TO_IP (e.g., as in Table 2 below), and MSR_LBR_INFO_ (e.g., as in Table 3 below) stores branch prediction flag, TSX information, and/or elapsed cycle data (e.g., since the last updated of the LBR stack), for example, where x (e.g., an integer) is the identification number of a logical processor corresponding to that LBR stack (e.g., entry).

TABLE 1 example format of MSR for last branch from instruction pointer (IP)

| Bit Field | Bit Offset | Access | Description |
|---|---|---|---|
| Data | 47:0 | Read/Write (R/W) | This is the "branch from" address |
| SIGN_EXt | 62:48 | R/W | Signed extension of bit 47 of this register. |
| MISPRED | 63 | R/W | When set, indicates either the target of the branch was mispredicted and/or the direction (taken/non-taken) was mispredicted; otherwise, the target branch was predicted. |

TABLE 2 example format of MSR for last branch to instruction pointer (IP)

| Bit Field | Bit Offset | Access | Description |
|---|---|---|---|
| Data | 47:0 | R/W | This is the "branch to" address |
| SIGN_EXt | 63:48 | R/W | Signed extension of bit 47 of this register. |

TABLE 3 example format of MSR for last branch information

| Bit Field | Bit Offset | Access | Description |
|---|---|---|---|
| Cycle Count (e.g., saturating) | 15:0 | R/W | Elapsed core clocks since last update to the LBR stack. |
| Reserved (e.g., used for event monitoring in certain embodiments) | 60:16 | R/W | Reserved (e.g., used for event monitoring in certain embodiments) |
| TSX_Abort | 61 | R/W | When set, indicates a TSX_Abort entry LBR_FROM: Extended Instruction Pointer (EIP) at the time of the TSX Abort LBR_TO: EIP of the start of Hardware Lock Elision (HLE) region OR EIP of the Restricted Transactional Memory (RTM) Abort Handler |
| IN_TSX | 62 | R/W | When set, indicates the entry occurred in a TSX region |
| MISPRED | 63 | R/W | When set, indicates either the target of the branch was mispredicted and/or the direction (taken/non-taken) was mispredicted; otherwise, the target branch was predicted. |

In one embodiment, software should query an architectural MSR (e.g., IA32_PERF_CAPABILITIES[5:0]) about the format of the address that is stored in the LBR stack. Four example formats are defined by the following encoding:

000000B (32-bit record format)—Stores 32-bit offset in current code segment (CS) of respective source/destination, 000001B (64-bit LIP record format)—Stores 64-bit linear address (LA) of respective source/destination, 000010B (64-bit EIP record format)—Stores 64-bit offset (effective address) of respective source/destination.

000011B (64-bit EIP record format) and Flags—Stores 64-bit offset (effective address) of respective source/destination. Misprediction information may be reported in the upper bit of 'FROM' registers in the LBR stack.

000100B (64-bit EIP record format), Flags and TSX—Stores 64-bit offset (effective address) of respective source/destination. Misprediction and transaction (e.g., Transactional Synchronization Extensions (TSX)) information may be reported in the upper bits of 'FROM' registers in an LBR stack.

000101B (64-bit EIP record format), Flags, TSX, LBR_INFO—Stores 64-bit offset (effective address) of respective source/destination. Misprediction, TSX, and elapsed cycles since the last LBR update may be reported in the LBR_INFO MSR stack.

000110B (64-bit LIP record format), Flags, Cycles—Stores 64-bit linear address (CS.Base+effective address) of respective source/destination. Misprediction information may be reported in the upper bits of 'FROM' registers in the LBR stack. Elapsed cycles since the last LBR update may be reported in the upper 16 bits of the 'TO' registers in the LBR stack.

000111B (64-bit LIP record format), Flags, LBR_INFO—Stores 64-bit linear address (CS.Base+effective address) of respective source/destination. Misprediction, and elapsed cycles since the last LBR update may be reported in the LBR_INFO MSR stack.

In certain embodiments, a processor's support for the architectural MSR (e.g., IA32_PERF_CAPABILITIES) is provided by executing a capabilities instruction, e.g., with the resulting values indicating the capabilities at CPUID.01H:ECX[PERF_CAPAB_MSR] (bit 15)).

A reservation station circuit 142 may be a single reservation station circuit (for example, shared between the execution circuits 140, e.g., execution input ports 144, 146, and/or 148) or a plurality of reservation station circuits (for example, one reservation station circuit of a plurality of reservation station circuits for each of the execution circuits 140, e.g., for each of execution input ports 144, 146, and/or 148).

The plurality of execution circuits 140 may include a plurality of different types of execution circuits, for example, integer type of execution circuit(s), memory type of execution circuit(s), floating point type of execution circuit(s), single instruction, multiple data (SIMD) (e.g., vector) type of execution circuit(s), or any combination thereof. Execution circuits 140 may include (i) a set of one or more integer type of execution circuits 150A, 150B, 150C, and 150D having corresponding integer ports 144 (labeled ports P0, P1, P2, and P3, respectively) (although shown as having four ports and four corresponding execution circuits of this type, any single or plurality may be utilized in certain embodiments), (ii) a set of one or more memory type of execution circuits 152A, 152B, and 152C, having corresponding memory ports 146 (labeled ports P4, P5, and P6, respectively) (although shown as having three ports and three corresponding execution circuits of this type, any single or plurality may be utilized in certain embodiments), and/or (iii) a set of one or more floating point type and/or SIMD type of execution circuits 154A, 154B, and 154C having corresponding floating point/SIMD ports 148 (labeled ports P7, P8, and P9, respectively) (although shown as having three ports and three corresponding execution circuits of this type, any single or plurality may be utilized in certain embodiments).

Operations to be executed (e.g., micro-operations from decoder circuits 120A-122A and/or decoder circuits 120B-122B) may be sent from allocation lanes 136 (for example, which may be any plurality, e.g., greater than the number of ports, equal to the number of ports, and/or less than the number or ports) to execution circuits 140 via ports 144, 146, and/or 148. In certain embodiments, the number of allocation lanes is referred to as the allocation width, e.g., the number of micro-operations which can be allocated (e.g., from instruction decode queue 124A and/or instruction decode queue 124B).

In certain embodiments, allocation circuit 138 is included to allocate the execution circuits 140 for the incoming micro-operations on allocation lanes 136. In certain embodiments, a reservation station circuit 142 is included to dispatch micro-operations when they are ready for execution, e.g., by sending the micro-operation on one or more issue (or dispatch) ports of the reservation station circuit 142 to a corresponding execution circuit of execution circuits 140. In one embodiment, a reservation station circuit 142 checks if the operand(s) for a micro-operation (e.g., as indicated in its reservation station entry) are available and if the corresponding execution circuit is available (e.g., free for use), and dispatches the micro-operation for execution in response to the operand(s) being available and the corresponding execution circuit being available. In certain embodiments, a processor utilizes register renaming to abstract a logical register from a physical register, e.g., with those logical register(s) utilized by reservation station (e.g., scheduler) circuit.

Processor core 100 may be one of a plurality of cores of a processor, e.g., of a system. Processor core 100 may include a branch predictor 102 (e.g., to predict one or more branches of the code (e.g., instructions) that are to be executed by the processor core 100. In certain embodiments, the branch predictor 102 (e.g., branch predictor circuit) learns from past behavior of branches to predict a next (e.g., incoming) branch. In certain embodiments, the branch predictor 102 predicts a proper subset of (e.g., contiguous in the original program order) instructions as a block of code (e.g., ending in a branch instruction). As one example, processor core 100 may receive code to execute and, in response, may divide the code into blocks.

In certain embodiments, the processor core 100 (e.g., via the fetch circuit 104 and/or branch predictor 102) may send the blocks of instructions to a decode cluster, for example, with a first block of instructions sent to decode cluster 0 108A, a (next in program order, e.g., younger) second block of instructions sent to decode cluster N 108B, etc. In a two-cluster example, a third (next in program order, e.g., younger) block of instructions may be sent to the next available decode cluster (e.g., after it has finished decoding of its current block of instructions). In a two-cluster example, a third (next in program order, e.g., younger) block of instructions may be sent to the next decode cluster (e.g., to decoder cluster 108A in this example). Although two decode clusters 108A-108B are shown, it should be understood that three or more clusters may be utilized (e.g., where "N" is a positive integer greater than one).

In certain embodiments, the branch predictor 102 of the processor core 100 divides code into individual blocks (e.g., of a set of contiguous instructions from the program). In certain embodiments, the fetch circuit 104 of the processor core 100 divides code into individual blocks (e.g., of a set of contiguous instructions from the program). The individual code blocks may then be sent to their respective decode cluster for decoding, for example, to a respective instruction data queue (e.g., instruction data queue 110A as an input queue for decode cluster 108A and instruction data queue 110B as an input queue for decode cluster 108B).

In certain embodiments, each decode cluster includes two or more (e.g., superscalar x86) instruction decoders capable of decoding different basic blocks of code out-of-order with respect to each other, for example, with decode cluster 108A including a first decoder circuit 120A (e.g., decoder) and a second decoder circuit 122A (e.g., decoder), and decode cluster 108B including a second decoder circuit 120B (e.g., decoder) and a second decoder circuit 122B (e.g., decoder).

In certain embodiments, the branch predictor 102 of the processor core 100 divides code into individual blocks (e.g., of a set of contiguous instructions from the program). In certain embodiments, the fetch circuit 104 of the processor core 100 divides code into individual blocks (e.g., of a set of contiguous instructions from the program). The individual code blocks may then be sent to their respective decode cluster for decoding, for example, to a respective instruction data queue (e.g., instruction data queue 110A as an input queue for decode cluster 108A and instruction data queue 110B as an input queue for decode cluster 108B).

Optionally, processor core 100 includes a (e.g., level one) instruction cache 106, e.g., to cache one or more instructions without having to load them from memory. In certain embodiments, fetch circuit 104 sends code blocks to their respective decode cluster via instruction cache 106. Instruction cache 106 may include an instruction cache tag and/or instruction translation lookaside buffer (TLB). In certain embodiments, once the code blocks are sent to their corresponding decode cluster 108A-108B, each decode cluster begins decoding the code blocks in parallel (e.g., via the parallel decoder circuits therein). In certain embodiments, decode clusters operate independently of each other, so the blocks of code can be decoded out-of-order (e.g., out of program order).

In certain embodiments, the allocation circuit 138 is responsible for allocating the operations (e.g., micro-operations) to the execution circuits 140 (e.g., execution units), e.g., in the proper program order. The allocation circuit 138 may perform retirement and/or renaming, e.g., as well as including a re-order buffer (ROB) for reordering any out-of-order instruction (e.g., micro-operation) execution. In certain embodiments, processor core 100 includes a reservation station circuit 142 to cause a micro-operation to be sent (e.g., dispatched) to execution circuits 140 when that micro-operation is ready for execution, e.g., source operand(s) are available. In certain embodiments, reservation station circuit 142 includes a plurality of reservation station entries, e.g., one for each micro-operation awaiting execution.

Processor core depicts a first decode cluster 108A with a plurality of decoder circuits 120A-122A in a first set 112A and a second decode cluster 108B with a plurality of decoder circuits 120B-122B in a second set 112B. In certain embodiments, a (e.g., each) decoder circuit (120A, 122A, 120B, 122B) is to decode a (e.g., macro) instruction into a set of one or more micro-operations that are to be executed (e.g., as a primitive) by an execution circuit(s) 140. In certain embodiments, a decoder circuit (120A, 122A, 120B, 122B) is to decode certain (e.g., macro) instructions into a corresponding set of one or more micro-operations without utilizing a microcode sequencer 128 (e.g., a microcode sequencer separate from any decode cluster and/or decoder circuit) and/or decode other (e.g., macro) instructions (e.g., complex instruction set computer (CISC) instructions) into a corresponding set of one or more micro-operations by utilizing the microcode sequencer 128 (e.g., the microcode sequencer separate from any decode cluster and/or decoder circuit). In one embodiment, a decoder circuit (120A, 122A, 120B, 122B) is to output a certain number of micro-operation per cycle (e.g., one micro-operation per cycle and/or between one and four micro-operations per cycle). In certain embodiments, a "micro-coded" instruction generally refers to an instruction where a decode cluster (e.g., set of decoders) requests the microcode sequencer 128 to load the corresponding set of one or more (e.g., plurality of) micro-operations (μops) from the microcode sequencer memory 130 (e.g., read-only memory (ROM)) into the decode pipeline (e.g., into the corresponding instruction decode queue), e.g., instead of producing that instruction's set of one or more micro-operations directly by a decoder circuit. For example, to implement some (e.g., complex) (e.g., x86) instructions, a microcode sequencer 128 is used to divide the instruction into a sequence of smaller (e.g., micro) operations (also referred to as micro-ops or μops).

In certain embodiments, each decode cluster (e.g., each decoder circuit in some embodiments) includes a data structure to store a corresponding entry point value (e.g., address) for one or more instructions into memory 130 of microcode sequencer 128 and/or a number of bits (e.g., the number of cycles to generate the corresponding micro-operations for an instruction and/or the number of micro-operations for the instruction). For example, (1) with data structure 114A of decode cluster 108A including one or more entries that each indicate (e.g., for a single instruction), an entry point 116A for an instruction and/or bits (e.g., a coded value) for the instruction and/or (2) with data structure 114B of decode cluster 108B including one or more entries that each indicate (e.g., for a single instruction), an entry point 116B for an instruction and/or bits (e.g., code) for the instruction. In certain embodiments, data structure 114A and data structure 114B are copies of each other, e.g., they include the same data. In one embodiment, data structure 114A and data structure 114B are loaded with their data at manufacturing time. In one embodiment, data structure 114A and data structure 114B are loaded with their data during processor boot, e.g., by executing Basic Input/Output System (BIOS) firmware or Unified Extensible Firmware Interface (UEFI) firmware.

After decoding of an instruction into its respective micro-operations (e.g., by decoder circuits or microcode sequencer), in certain embodiments they are stored in an instruction decode queue. In FIG. 1 (e.g., at the end of the decode stage), decode cluster 108A includes instruction decode queue 124A (e.g., instruction queue) that receives respective micro-operations from decoder circuits 120A-122A and from microcode sequencer 128 (e.g., when decode cluster 108A is arbitrated access to memory 130) and decode cluster 108B includes instruction decode queue 124B (e.g., instruction queue) that receives respective micro-operations from decoder circuits 120B-122B and from microcode sequencer 128 (e.g., when decode cluster 108B is arbitrated access to memory 130).

Optionally, switch 134 is included to couple output(s) of instruction decode queues 124A-124B to allocation lanes 136 (e.g., input(s)) of allocation circuit 138. In certain embodiments, allocation circuit 138 is to send micro-operations from the instruction decode queues 124A-124B (e.g., in or out of program order) to an execution circuit of execution circuits 140 (e.g., via reservation station circuit 142). In certain embodiments, processor core 100 includes a reservation station circuit 142 to cause a micro-operation to be sent (e.g., dispatched) to execution circuits 140 when that micro-operation is ready for execution, e.g., source operand(s) are available. In certain embodiments, reservation station circuit 142 includes a plurality of reservation station entries, e.g., one for each micro-operation awaiting execution.

Certain execution circuits 140 (e.g., memory execution circuits 150A-154C) may access storage, e.g., registers 156, data cache 158 (e.g., one or more levels of a cache hierarchy), and/or translation lookaside buffer (TLB) 160 (e.g., translate a virtual (e.g., source or destination) address to a physical address (for example, in memory external from the core 100, e.g., memory 980 in FIG. 9B). Once the resultants are generated by the execution circuits 140, a retirement circuit (e.g., within allocation circuit 138) may then retire a corresponding instruction, for example, that instruction being a taken instruction, e.g., an executed instruction whose results are correct and visible (e.g., an instruction that is not rolled back or aborted). In one embodiment, retirement of a (e.g., correct execution path) instruction can proceed when two conditions are satisfied: (i) the micro-operation(s) associated with the instruction to be retired have completed, allowing the retirement of the entire instruction (or in the case of instructions that generate very large number of micro-operations, e.g., enough to fill the retirement window) and (ii) older instructions and their micro-operations of correctly predicted paths have retired. In certain embodiments, a last branch record circuit is to monitor instructions as they are retired.

Figure 2:
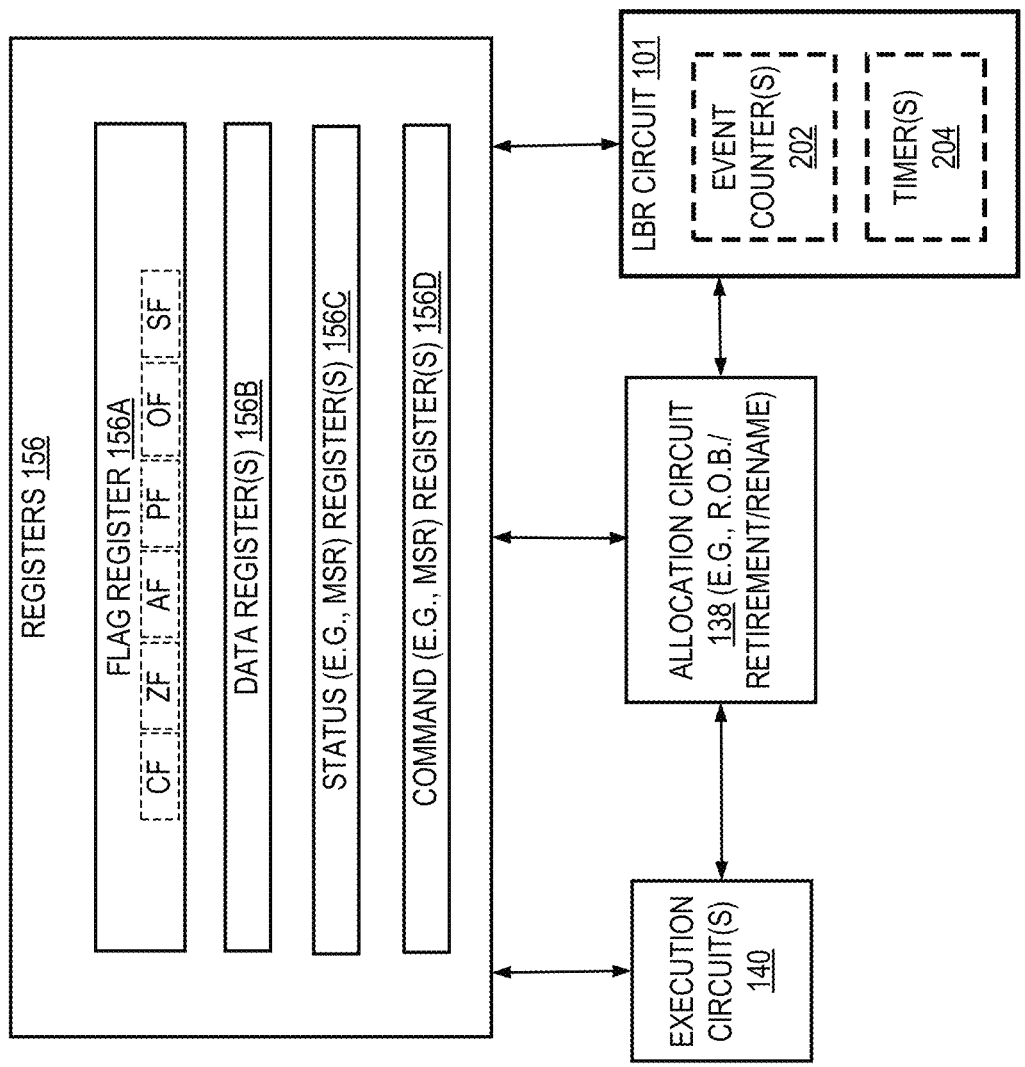
FIG. 2 illustrates a last branch record circuit coupled with execution circuit(s), an allocation circuit, and registers according to embodiments of the disclosure.

FIG. 2 illustrates a last branch record circuit 101 (e.g., as in instance of last branch record circuit 101A or last branch record circuit 101B in FIG. 1) coupled with execution circuit(s) 140, an allocation circuit 138 (e.g., with ROB, retirement circuitry, and/or rename circuitry), and registers 156 according to embodiments of the disclosure. In certain embodiments, LBR circuit 101 captures cycle timing along with specific values (e.g., bits) for performance monitoring event counting/attribution. In certain embodiments, LBR circuit 101 includes one or more event counters 202 and one or more timers 204. Event counters may monitor (e.g. and increment or decrement) a value based on certain (e.g., pre-selected) events occurring. The event type may be chosen from an extensive list of performance-related events to monitor, such as for example: cache misses and/or hits (e.g., in data cache, instruction cache, level one, level 2, other levels, etc.), TLB misses and/or hits, remote (e.g., outside of the core) cache hits, branch mispredictions, bad store-to-load forwards, function call retired, x87 floating point assist, split cache-line access, transactional synchronization abort, instruction retired, and various kinds of hardware stalls (e.g., pipeline stalls), etc. The list of supported event types may vary depending on the manufacturer and/or the model of the processor. The processor state may include the execution instruction pointer (IP) and execution-related states such as counters, contents of registers and execution circuits, memory addresses, latencies, and the like that may affect processor performance.

In certain embodiments, registers 156 includes any one or combination of: flag registers 156A, data registers 156B (e.g., EAX, EBX, ECX, EDX, etc. registers), status (e.g., MSR) register(s) 156C, or command (e.g., MSR) register(s) 156D. In certain embodiments, a value written to command register(s) instructs the hardware (e.g., last branch record circuit) what to record, etc. In certain embodiments, the hardware (e.g., last branch record circuit) writes its data (e.g., from event counter(s) 202 and/or timer(s) 204) into status (e.g., MSR) registers 156C.

In certain embodiments, last branch record (LBR) hardware (e.g., circuit) includes a performance monitoring feature that records a series of branch target and destination addresses, as well as timing data during that series, e.g., in the form of exact core cycle timings between two taken branches. Thus, in certain embodiments, each LBR entry (e.g., stored into a corresponding status register of a plurality of status registers 156C) represents a series of contiguously executed instructions with an accompanying exact timing which allows the reconstruction of the path of software execution. Understanding paths of execution is incredibly valuable in both functional and performance analysis, and aggregate timing data across a block of instructions is useful for performance analysis in many cases. Embodiments of an LBR circuit logs event information in addition to tracking timing, for example, by adding a per-counter indication of precise event occurrences for each and every timed LBR entry, e.g., which will greatly increase a user's ability to understand and root cause specific LBR timings and code segments.

In one embodiment, the flag register 156A includes a field (e.g., a single bit wide) for each flag therein. Flags may include one, all, or any combination of a carry flag (CF), a zero flag (ZF), an adjust flag (AF), a parity flag (PG), an overflow flag (OF), or a sign flag (SF). In one embodiment, flag register 156A (e.g., only) includes six flags (e.g., CF, ZF, AF, PF, OF, and SF). In one embodiment, each flag is a single bit, e.g., with certain bits of the register not utilized. In one embodiment, CF is in bit index zero of flag register 156A, ZF is in bit index six of flag register 156A, AF is in bit index four of flag register 156A, PF is in bit index two of flag register 156A, OF is in bit index eleven of flag register 156A, and/or SF is in bit index seven of flag register 156A.

In certain embodiments, flag register 156A is a single logical register, e.g., referenced as EFLAGS (e.g., 32 bits wide) or RFLAGS (e.g., 64 bits wide). In certain embodiments, carry flag (CF) (e.g., bit) is set (e.g., to binary one) (e.g., by flag logic in an execution circuit that updates the flag register) if the result of an (e.g., arithmetic) operation (e.g., a micro-operation) has an arithmetic carry and cleared (e.g., to binary zero) if there is no arithmetic carry. In certain embodiments, a zero flag (ZF) is set (e.g., to binary one) (e.g., by flag logic in an execution circuit that updates the flag register) if the result of an (e.g., arithmetic) operation (e.g., a micro-operation) is a zero and cleared (e.g., to binary zero) if not a zero. In certain embodiments, an adjust flag (AF) (or auxiliary flag or auxiliary carry flag) is set (e.g., to binary one) (e.g., by flag logic in an execution circuit that updates the flag register) if the (e.g., arithmetic) operation (e.g., a micro-operation) has caused an arithmetic carry or borrow (e.g., out of the four least significant bits) and cleared (e.g., to binary zero) otherwise. In certain embodiments, a parity flag (PG) is set (e.g., to binary one) (e.g., by flag logic in an execution circuit that updates the flag register) if the result of an (e.g., arithmetic) operation (e.g., a micro-operation) has an even number and cleared (e.g., to binary zero) if an odd number. In certain embodiments, an overflow flag (OF) is set (e.g., to binary one) (e.g., by flag logic in an execution circuit that updates the flag register) if the result of an (e.g., arithmetic) operation (e.g., a micro-operation) overflows and cleared (e.g., to binary zero) if there is no overflow, for example, an overflow when the (e.g., signed two's-complement) result of the operation would not fit in the number of bits used for the operation, e.g., is wider than the execution circuit (e.g., arithmetic logic unit (ALU) thereof) width. In certain embodiments, a sign flag (SF) is set (e.g., to binary one) (e.g., by flag logic in an execution circuit that updates the flag register) if the result of an (e.g., arithmetic) operation (e.g., a micro-operation) has a negative number and cleared (e.g., to binary zero) if a positive number, e.g., for a signed (+ or −) value resultant.

FIG. 3 illustrates last branch record capabilities written into data register(s) 156B according to embodiments of the disclosure. In certain embodiments, execution of a capabilities instruction (e.g., CPUID instruction) causes a processor to reveal to software the processor type and/or presence of features by returning a resultant value (e.g., in (capabilities) register EAX 302, EBX 304, ECX 306, and/or EDX 308) that indicates the processor type and/or presence of features. In one embodiment, execution of CPUID instruction causes the data register(s) 156B to be loaded with data that indicates the main category of information returned (e.g., the CPU ID leaf) and/or data that indicates specific supported features (e.g., LBR functions) for that category, e.g., depending on which logical core (e.g., logical processor) the CPUID instruction was executed run for (e.g., run "on").

In the depicted embodiment, register ECX 306 includes values at bits [19:16] that indicate if a particular event (e.g., performance monitoring event) may be tracked. The example includes four bits for four counters (e.g., indexed 0 to 3), but is should be understood that other number of counters or a single counter may be utilized. In one embodiment, the number of programmable counters which support event tracking may be less than (e.g., a proper subset of) the total number of programmable counters (e.g., of a processor core).

Figure 4:
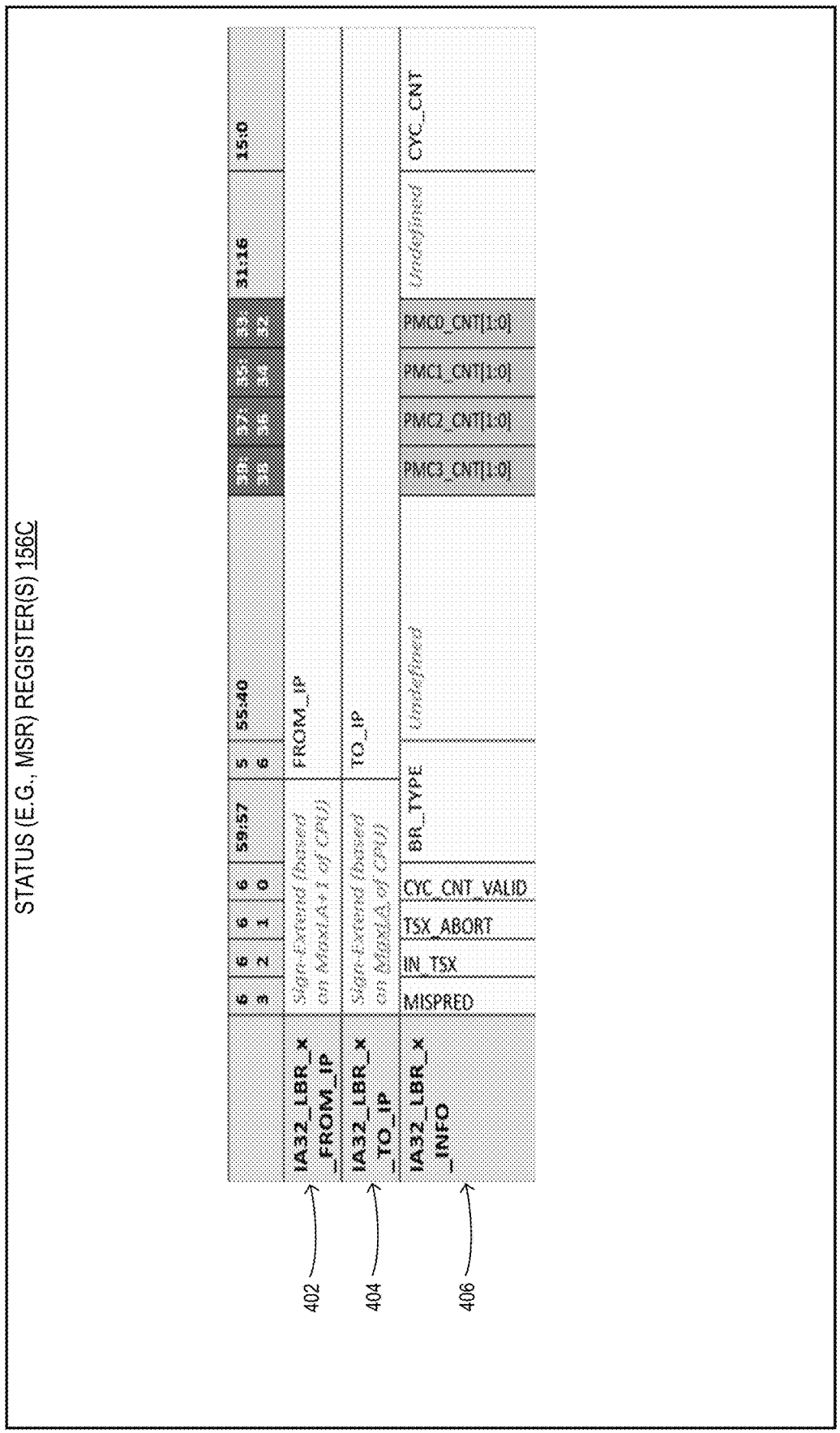
FIG. 4 illustrates last branch record information written into status register(s) according to embodiments of the disclosure.

FIG. 4 illustrates last branch record information written into status register(s) 156C according to embodiments of the disclosure. In certain embodiments, a last branch record circuit (e.g., when enabled to do so) is to store the values (e.g., from event counter(s) 202 and/or timer(s) 204) once so trigged, for example, when triggered by a second (e.g., branch) instruction (e.g., "to IP") after a first (e.g., branch) instruction (e.g., "from IP"). In one embodiment, the first register 402 (e.g., MSR) includes the instruction pointer of the first (e.g., taken) branch instruction (e.g., such instruction triggering a "cleared" event counter(s) 202 and/or timer(s) 204 to begin counting events and/or counting time, respectively). In one embodiment, the second register 404 (e.g., MSR) includes the instruction pointer of a target address of the first taken branch instruction. In certain embodiments, the second (e.g., taken) (e.g., in program order) branch instruction triggers a sending of the counted events and/or counted time and/or clearing the event counter(s) 202 and/or timer(s) 204. In certain embodiments, the counted events are the delta of events counted for that time period from an event counter, e.g., the event counter itself not being cleared by the LBR circuit. In one embodiment, the storing of the data in registers 402, 404, and 406 (e.g., as a single, logical entry in an LBR stack) causes the cleared event counter(s) 202 and/or timer(s) 204 to again begin counting events and/or counting time, respectively.

In one embodiment, the third register 406 (e.g., MSR) contains certain values, e.g., as discussed in reference to Table 3 above. In certain embodiments, the values from the event counter(s) are stored into the third register 406. Register 406 may include a field that when set indicates that the cycle count (CYC_CNT) is valid (e.g., bit [60]). Register 406 may include a field (e.g., value) that indicates branch type (BR_TYPE) (e.g., bits [59-56]), e.g., the branch type of the first (or second) branch of a pair of branch instructions. Example branch types may include JCC (e.g., having a mnemonic of JCC, J*CXZ, or LOOP*), NEAR_REL_JMP (e.g., having a mnemonic of Near JMP imm), NEAR_IND_JMP (e.g., having a mnemonic of Near JMP reg/mem), NEAR_REL_CALL (e.g., having a mnemonic of Near CALL imm), NEAR_IND_CALL (e.g., having a mnemonic of Near CALL reg/mem), NEAR_RET (e.g., having a mnemonic of Near RET), or FAR_BRANCH (e.g., having a mnemonic of Far JMP/CALL/RET, SYS*, INTR, IRET, INT*, fault, TSX Abort, EENTER (enclave enter), EEXIT (enclave enter), AEX (Asynchronous Enclave Exit), INIT (initialize library code), or SIPI (Startup Inter-Processor Interrupt)).

In certain embodiments, LBR Event Logging hardware implementation adds new bits into the third register 406 (e.g., IA32_LBR_x_INFO) which record the programmable counter event counts which incremented during the contiguous code segment indicated by the LBR entry. The depicted design adds eight additional bits representing four programmable counters with two bits each for counting event occurrences. This will enable recording when 0, 1, 2, or 3+ (e.g., saturated) events fired during the code segment on programmable counters 0, 1, 2, and 3 (PMC0-3). Note that additional bits can be added to enable additional programmable counter coverage and/or enable the ability to count a higher number of event counts.

In certain embodiments, a processor (e.g., each logical processor) stores (e.g., simultaneously) more than one entry (e.g., more than one instance of registers 402, 404, and 406), e.g., a set of 6, 9, 12, 15, etc. of status registers. In one embodiment, different processors (e.g., cores) have a different number of sets of status registers, e.g., 4 sets (for example, 12 status registers total for 4 logical entries, e.g., with a single entry shown in FIG. 4), 16 sets, 32 sets, etc.

Figure 5:
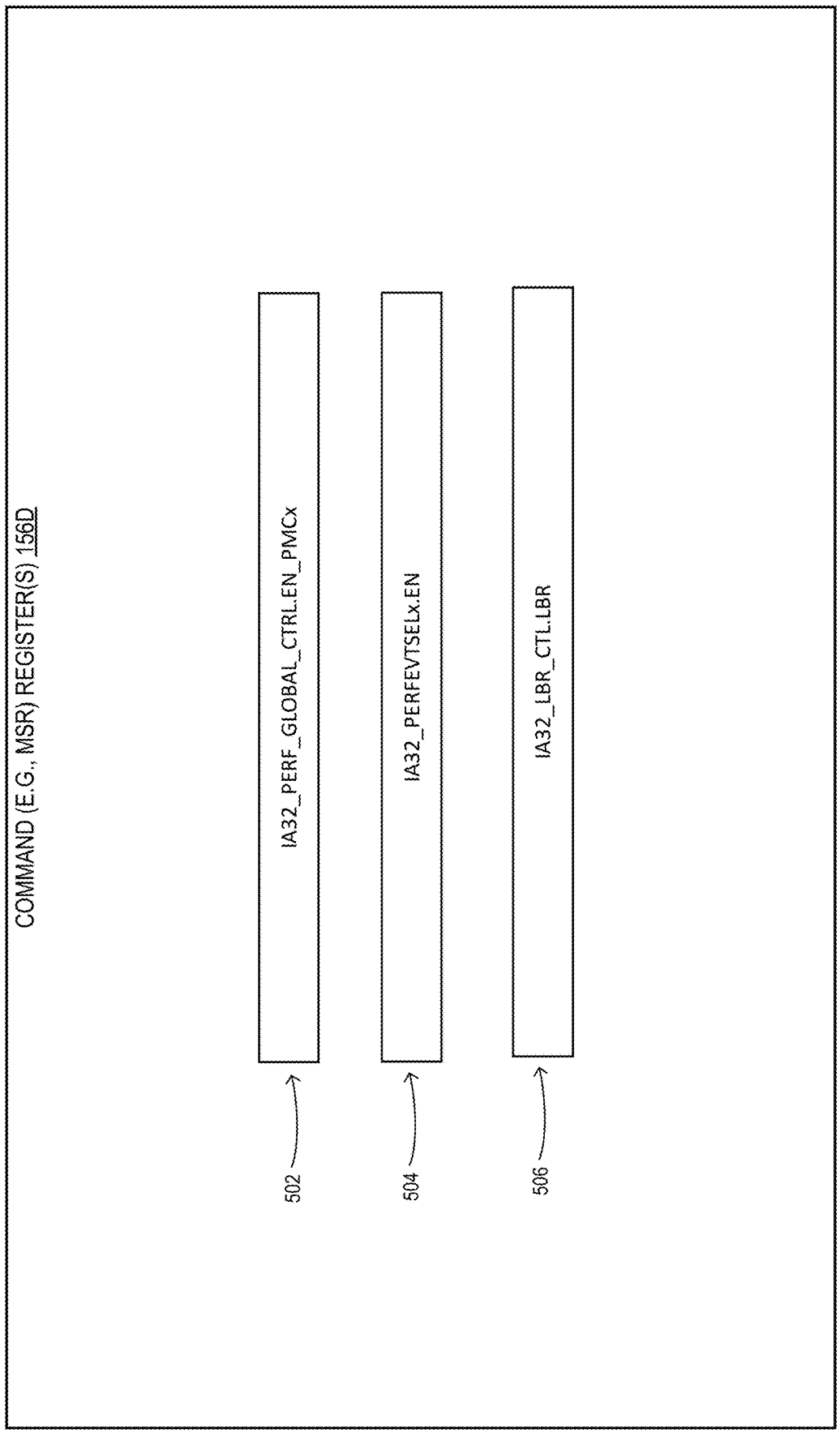
FIG. 5 illustrates command register(s) for a last branch record circuit according to embodiments of the disclosure.

FIG. 5 illustrates command register(s) 156D for a last branch record circuit according to embodiments of the disclosure. In certain embodiments, code (e.g., system level code and user level code or system level code but not user level code) is to execute one or more instructions to program values into command register(s) 156D to enable LBR circuit to perform the functionality discussed herein (e.g., to enable LBR event logging and cycle counting). Command register(s) 156D may include a first command register 502 (e.g., IA32_PERF_GLOBAL_CTRL.EN_PMCx), a second command register 504 (e.g., IA32_PERFEVTSELx.EN), and a third command register 506 (e.g., IA32_LBR_CTL.LBR). Performance tools can program to utilize the LBR event logging feature by providing the following configuration which will allow PMCx_CNT to be incremented:

Performance Monitoring Counter (PMCx) is enabled:
      IA32_PERF_GLOBAL_CTRL.EN_PMCx && IA32_PERFEVTSELx.EN
   PMCx opts into logging in LBRs:
      IA32_PERFEVTSELx.EN_LBR_LOG=1
   PMCx event is precise
   LBRs are enabled:
      IA32_LBR_CTL.LBR_EN=1
   Current privilege level (CPL) matches IA32_LBR_CTL.USR/OS settings:
   PMCx_CNT<3 (e.g., given 2 bits, the counts would saturate at 3)

Then, upon retirement of a branch that updates LBR, the processor will write the internal PMCx_CNT event count into IA32_LBR_0_INFO, then clear internal PMCx_CNT in certain embodiments. Finally, the internal PMCx_CNT count will be reset when LBRs are disabled or frozen in certain embodiments:

~IA32_LBR_CTL.LBR_EN||IA32_PERF_GLOBAL_STATUS.LBRS_FROZEN

Sampling LBR data over a period of time can provide a population of LBR timing samples for a given block of instructions. That population of timing samples is useful in the aggregate, but the specific samples in that population can also provide useful performance insights. Consider the example of a block of pseudocode like that in FIG. 6 below.

FIG. 6 illustrates a pseudocode block 600 according to embodiments of the disclosure. Pseudocode block 600 includes the instruction pointers (e.g., hexadecimal 3AE0). Pseudocode block 600 includes a branch instruction of jump if zero (JZ) 602 that jumps to the specified location (e.g., target address "3B14") if the Zero Flag (ZF) is set (e.g., to logical one) (e.g., in flag register 156A) and falls through (e.g., the next instruction in program order after 3AFB is executed) otherwise.

Aggregate LBR data can inform that this pseudocode block 600 of instructions was executed a certain number (e.g., 10K) times and took a mean of a certain number (e.g., 25) cycles to execute, but looking at the individual LBR timings may show that the timings range from a minimum number of cycles (e.g., 3) up to a maximum number of (e.g., 147) cycles. See FIG. 7 for an illustration of the population of LBR timing samples.

Figure 7:
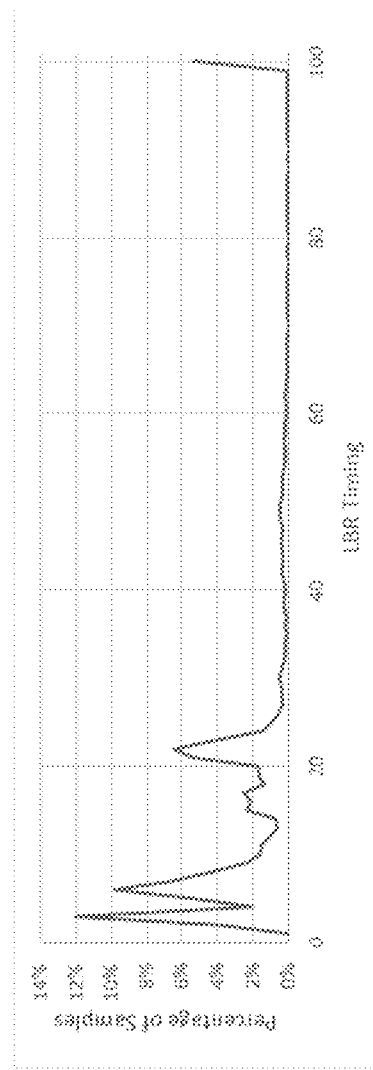
FIG. 7 illustrates a last branch record timing graph according to embodiments of the disclosure.

FIG. 7 illustrates a last branch record timing graph 700 according to embodiments of the disclosure. Given that in some cases pseudocode 600 can execute in a certain number of cycles, users (e.g., performance engineers) may desired to understand why the mean is a certain number of (e.g., 25) cycles, and also why does it take over a threshold number (e.g., 100) cycles in some cases. In FIG. 7, this population of LBR timing samples shows us that the top 5% longest execution times account for >40% of the total time spent in this block of code. Thus, understanding the specific behaviors that cause execution time to increase from a certain number of (e.g., 3) cycles to over a threshold number (e.g., 100) cycles allows a user to substantially reduce the mean and total execution times of this block of code. Certain software blocks display a similar pattern of variation in timings where there are certain outlier timings that cause a significant increase in mean timing when compared to the minimum timing. These situations could substantially benefit from identifying, root causing, and optimizing away only the slowest executions. Additionally, in some software applications it is critical to reduce the latency and/or timing variance of every single execution of a given block of code, so understanding all factors that delay the execution of that block is important.

In the example described above, these bottlenecks may be related to the time expended in waiting for the two loads be satisfied depending on the location that the data is found in the cache hierarchy. If this is correct, then LBR event logging configured with cache hit and/or miss events as discussed herein would indicate that most of the executions that took greater than a threshold number of (e.g., 100) cycles also suffered a (e.g., level 3) cache miss, and that these are responsible for >40% of time spent in this block of code. This information would enable a developer to specifically target optimizations to reducing (e.g., L3) cache misses, providing significant performance improvement while minimizing the software performance experts' time required to identify and resolve this issue. Embodiments herein allow the automatic tracking (e.g., and identification) of issues across numerous (e.g., thousands) of blocks of code, which no human could perform. Identifying the cause of degradations can cost a large amount of time across numerous (e.g., thousands) of blocks without events that are directly tied to higher block execution times.

Embodiments herein provide for novel LBR features and performance monitoring event sampling do not provide sufficient information that distinguish specific timing behaviors from the aggregate, e.g., by providing both the exact cycle timing and indication of the number of times that a set of performance monitoring events was triggered for the same execution of a block of instructions. This enables direct attribution from hardware behaviors and timing, explaining the behaviors that are correlated with variation in execution timing. When combined with machine learning algorithms, embodiments herein allow for the automatic identification and root cause outlier LBR timings effectively thus increasing efficiency and efficacy of LBR based performance analysis.

Figure 8:
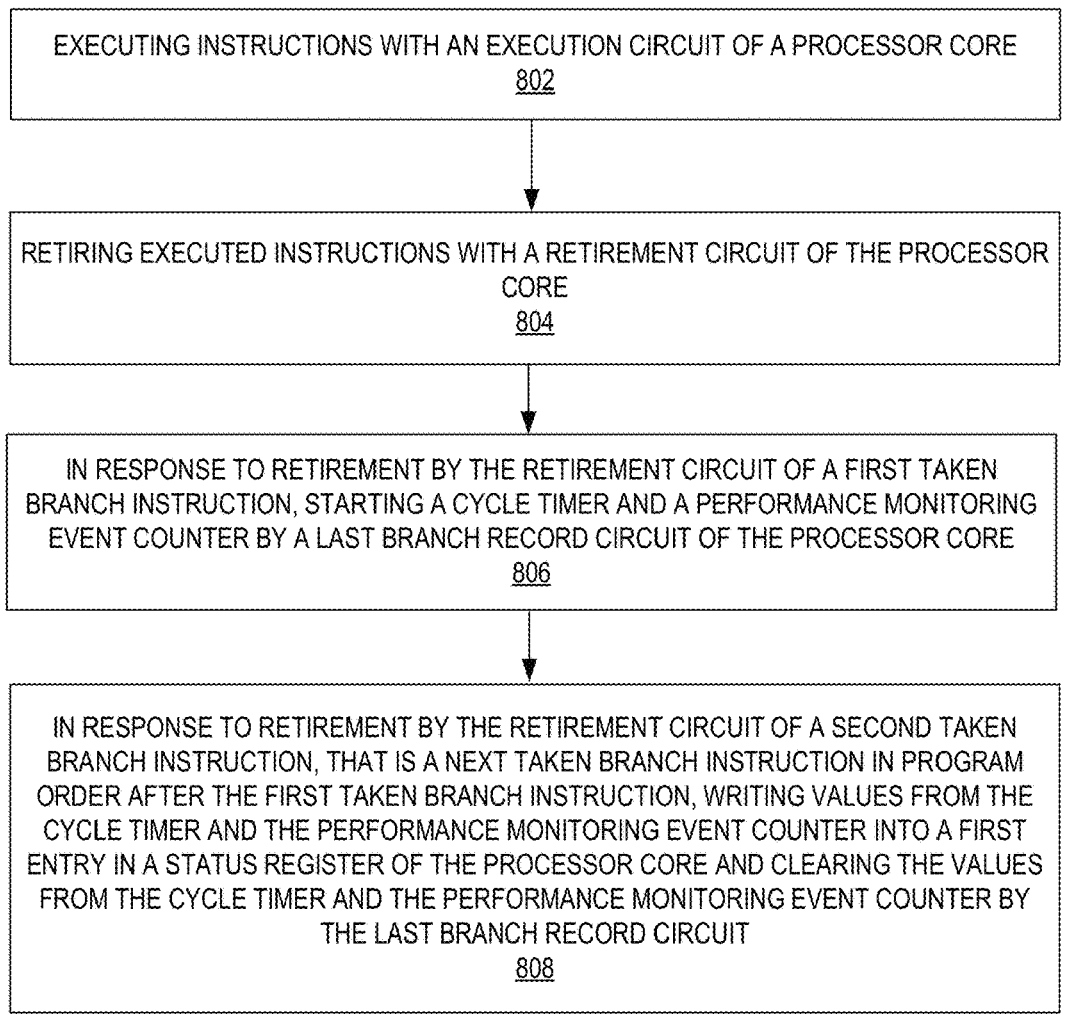
FIG. 8 is a flow diagram illustrating operations for recording last branch records according to embodiments of the disclosure.

FIG. 8 is a flow diagram illustrating operations 800 for recording last branch records according to embodiments of the disclosure. Some or all of the operations 800 (or other processes described herein, or variations, and/or combinations thereof) are performed under the control of a last branch record circuit.

The operations 800 include, at block 802, executing instructions with an execution circuit of a processor core. The operations 800 further include, at block 804, retiring executed instructions with a retirement circuit of the processor core. The operations 800 further include, at block 806, in response to retirement by the retirement circuit of a first taken branch instruction, starting a cycle timer and a performance monitoring event counter by a last branch record circuit of the processor core. The operations 800 further include, at block 808, in response to retirement by the retirement circuit of a second taken branch instruction, that is a next taken branch instruction in program order after the first taken branch instruction, writing values from the cycle timer and the performance monitoring event counter into a first entry in a status register of the processor core and clearing the values from the cycle timer and the performance monitoring event counter by the last branch record circuit.

Exemplary architectures, systems, etc. that the above may be used in are detailed below.

At least some embodiments of the disclosed technologies can be described in view of the following examples:

Example 1. An apparatus comprising:
an execution circuit to execute instructions;
a retirement circuit to retire executed instructions;
a status register; and
a last branch record circuit to:
in response to retirement by the retirement circuit of a first taken branch instruction, start a cycle timer and a performance monitoring event counter, and
in response to retirement by the retirement circuit of a second taken branch instruction, that is a next taken branch instruction in program order after the first taken branch instruction, write values from the cycle timer and the performance monitoring event counter into a first entry in the status register and clear the values from the cycle timer and the performance monitoring event counter.

Example 2. The apparatus of example 1, wherein the last branch record circuit is to:
in response to retirement by the retirement circuit of the second taken branch instruction, start the cycle timer and the performance monitoring event counter after the clear, and
in response to retirement by the retirement circuit of a third taken branch instruction, that is a next taken branch instruction in program order after the second taken branch instruction, write values from the cycle timer and the performance monitoring event counter into a second entry in the status register and clear the values from the cycle timer and the performance monitoring event counter.

Example 3. The apparatus of example 1, further comprising a cache, wherein the last branch record circuit is to update a first counter of the performance monitoring event counter for a hit in the cache for an instruction between the first taken branch instruction and the second taken branch instruction in program order.

Example 4. The apparatus of example 3, further comprising a translation lookaside buffer, wherein the last branch record circuit is to update a second counter of the performance monitoring event counter for a miss in the translation lookaside buffer for an instruction between the first taken branch instruction and the second taken branch instruction in program order.

Example 5. The apparatus of example 1, wherein the execution circuit is to, in response to execution of a capabilities instruction, load a value into a register of the apparatus that indicates a number of counters of the performance monitoring event counter.

Example 6. The apparatus of example 1, wherein the performance monitoring event counter comprises a plurality of counters for different performance monitoring events, and, in response to retirement by the retirement circuit of the second taken branch instruction, the last branch record circuit is further to write an instruction pointer of the first taken branch instruction and an instruction pointer of a target address of the first taken branch instruction into the first entry of the status register with the values of the plurality of counters.

Example 7. The apparatus of example 1, wherein, in response to retirement by the retirement circuit of the second taken branch instruction, the last branch record circuit is further to write an instruction pointer of the first taken branch instruction and an instruction pointer of a target address of the first taken branch instruction into the first entry of the status register.

Example 8. The apparatus of example 1, further comprising a command register comprising a plurality of bits, wherein the performance monitoring event counter comprises a plurality of counters for different performance monitoring events, and, when a corresponding bit is set in the command register, enables the performance monitoring event counter to count a corresponding performance monitoring event.

Example 9. A method comprising:
executing instructions with an execution circuit of a processor core;
retiring executed instructions with a retirement circuit of the processor core;
in response to retirement by the retirement circuit of a first taken branch instruction, starting a cycle timer and a performance monitoring event counter by a last branch record circuit of the processor core; and in response to retirement by the retirement circuit of a second taken branch instruction, that is a next taken branch instruction in program order after the first taken branch instruction, writing values from the cycle timer and the performance monitoring event counter into a first entry in a status register of the processor core and clearing the values from the cycle timer and the performance monitoring event counter by the last branch record circuit.

Example 10. The method of example 9, further comprising:

in response to retirement by the retirement circuit of the second taken branch instruction, starting the cycle timer and the performance monitoring event counter by the last branch record circuit after the clearing; and in response to retirement by the retirement circuit of a third taken branch instruction, that is a next taken branch instruction in program order after the second taken branch instruction, writing values from the cycle timer and the performance monitoring event counter into a second entry in the status register and clearing the values from the cycle timer and the performance monitoring event counter by the last branch record circuit.

Example 11. The method of example 9, further comprising updating a first counter of the performance monitoring event counter for a hit in a cache of the processor core for an instruction between the first taken branch instruction and the second taken branch instruction in program order by the last branch record circuit.

Example 12. The method of example 11, further comprising updating a second counter of the performance monitoring event counter for a miss in a translation lookaside buffer of the processor core for an instruction between the first taken branch instruction and the second taken branch instruction in program order by the last branch record circuit.

Example 13. The method of example 9, further comprising executing a capabilities instruction with the execution circuit to load a value into a register of the processor core that indicates a number of counters of the performance monitoring event counter.

Example 14. The method of example 9, wherein the performance monitoring event counter comprises a plurality of counters for different performance monitoring events, and, in response to retirement by the retirement circuit of the second taken branch instruction, the method further comprising writing an instruction pointer of the first taken branch instruction and an instruction pointer of a target address of the first taken branch instruction into the first entry of the status register with the values of the plurality of counters by the last branch record circuit.

Example 15. The method of example 9, wherein, in response to retirement by the retirement circuit of the second taken branch instruction, further comprising writing an instruction pointer of the first taken branch instruction and an instruction pointer of a target address of the first taken branch instruction into the first entry of the status register by the last branch record circuit.

Example 16. The method of example 9, wherein the performance monitoring event counter comprises a plurality of counters for different performance monitoring events, and the method further comprises, when a corresponding bit is set in a plurality of bits of a command register of the processor core, enabling the performance monitoring event counter to count a corresponding performance monitoring event.

Example 17. An apparatus comprising:
an execution circuit to execute instructions;
a status register; and
a last branch record circuit to:
in response to a first taken branch instruction, start a cycle timer and a performance monitoring event counter, and
in response to a second taken branch instruction, that is a next taken branch instruction in program order after the first taken branch instruction, write values from the cycle timer and the performance monitoring event counter into a first entry in the status register and clear the values from the cycle timer and the performance monitoring event counter.

Example 18. The apparatus of example 17, wherein the last branch record circuit is to:
in response to the second taken branch instruction, start the cycle timer and the performance monitoring event counter after the clear, and
in response to a third taken branch instruction, that is a next taken branch instruction in program order after the second taken branch instruction, write values from the cycle timer and the performance monitoring event counter into a second entry in the status register and clear the values from the cycle timer and the performance monitoring event counter.

Example 19. The apparatus of example 17, further comprising a cache, wherein the last branch record circuit is to update a first counter of the performance monitoring event counter for a hit in the cache for an instruction between the first taken branch instruction and the second taken branch instruction in program order.

Example 20. The apparatus of example 19, further comprising a translation lookaside buffer, wherein the last branch record circuit is to update a second counter of the performance monitoring event counter for a miss in the translation lookaside buffer for an instruction between the first taken branch instruction and the second taken branch instruction in program order.

Example 21. The apparatus of example 17, wherein the execution circuit is to, in response to execution of a capabilities instruction, load a value into a register of the apparatus that indicates a number of counters of the performance monitoring event counter.

Example 22. The apparatus of example 17, wherein the performance monitoring event counter comprises a plurality of counters for different performance monitoring events, and, in response to the second taken branch instruction, the last branch record circuit is further to write an instruction pointer of the first taken branch instruction and an instruction pointer of a target address of the first taken branch instruction into the first entry of the status register with the values of the plurality of counters.

Example 23. The apparatus of example 17, wherein, in response to the second taken branch instruction, the last branch record circuit is further to write an instruction pointer of the first taken branch instruction and an instruction pointer of a target address of the first taken branch instruction into the first entry of the status register.

Example 24. The apparatus of example 17, further comprising a command register comprising a plurality of bits, wherein the performance monitoring event counter comprises a plurality of counters for different performance monitoring events, and, when a corresponding bit is set in the command register, enables the performance monitoring event counter to count a corresponding performance monitoring event.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary graphics processors are described next. Followed by exemplary core architectures, and descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front-end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front-end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front-end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general-purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
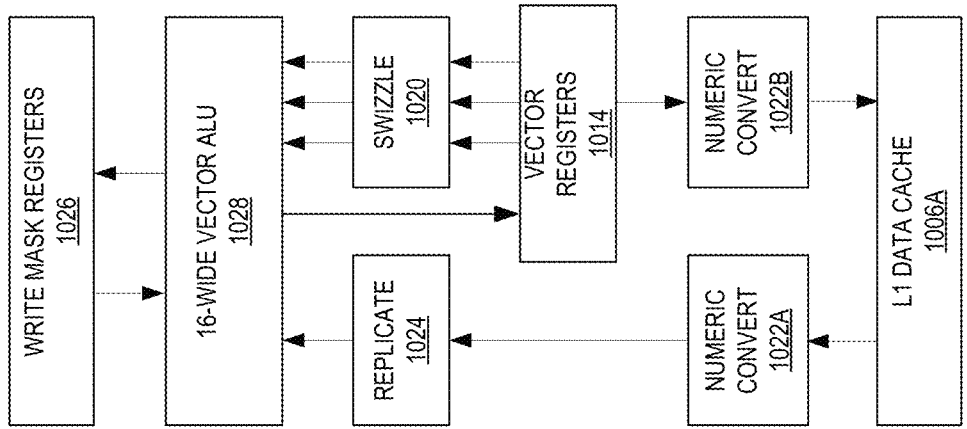
FIG. 10B is an expanded view of part of the processor core in FIG. 10A according to embodiments of the disclosure.
Figure 10A:
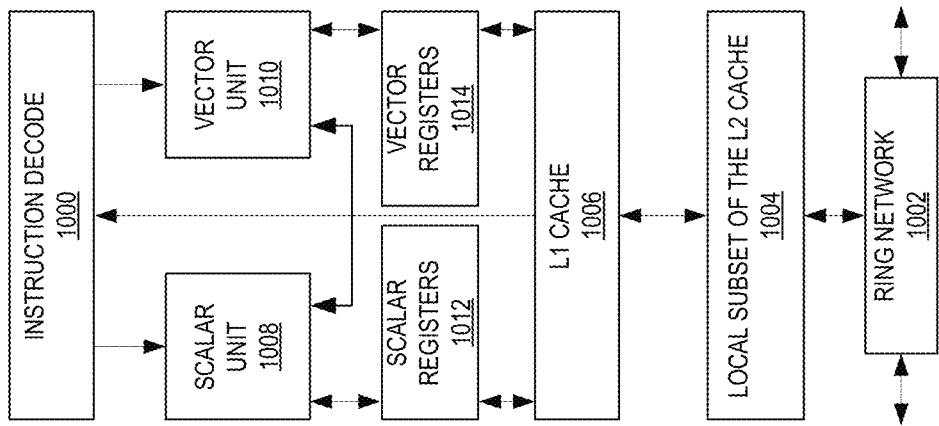
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
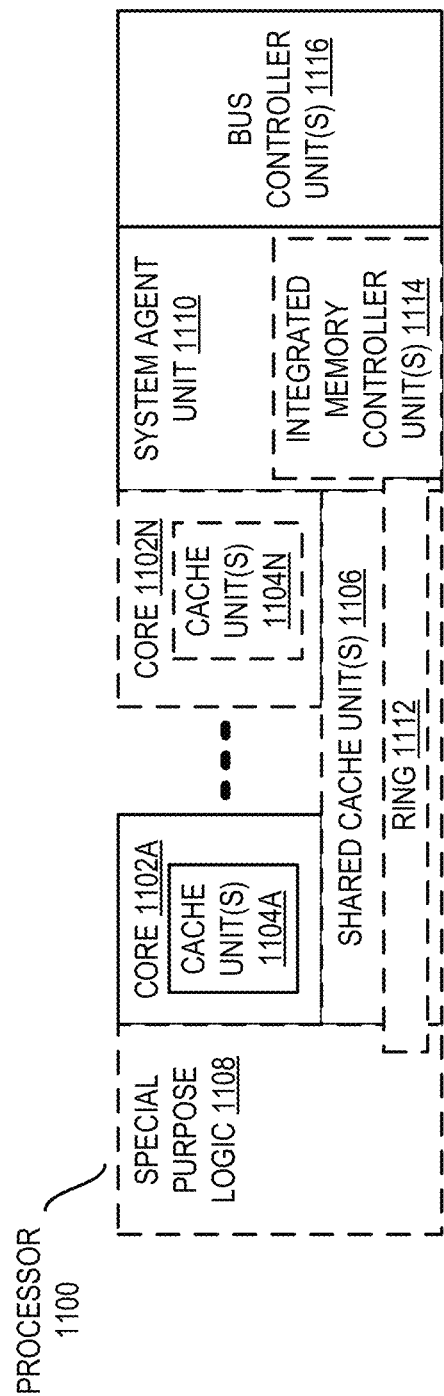
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring-based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 12:
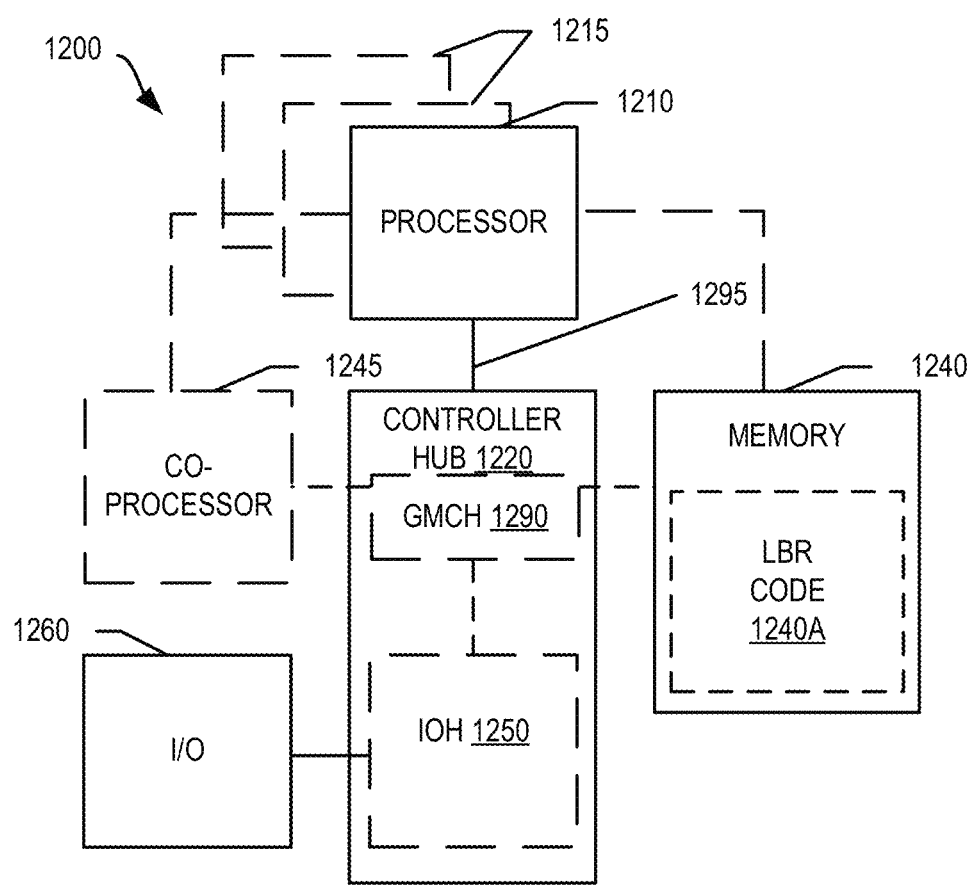
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include LBR code 1240A, for example, that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random-access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
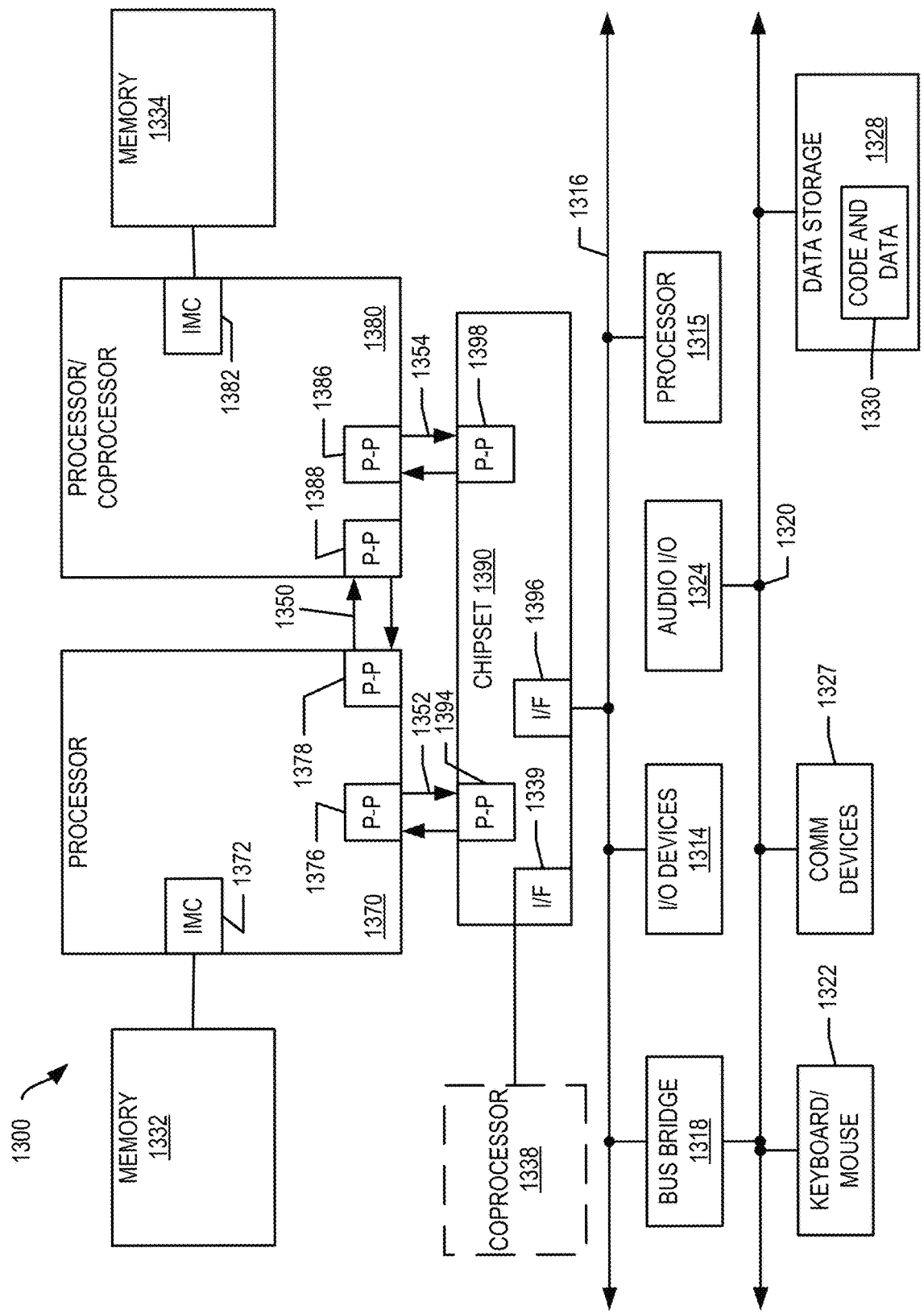
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units, point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
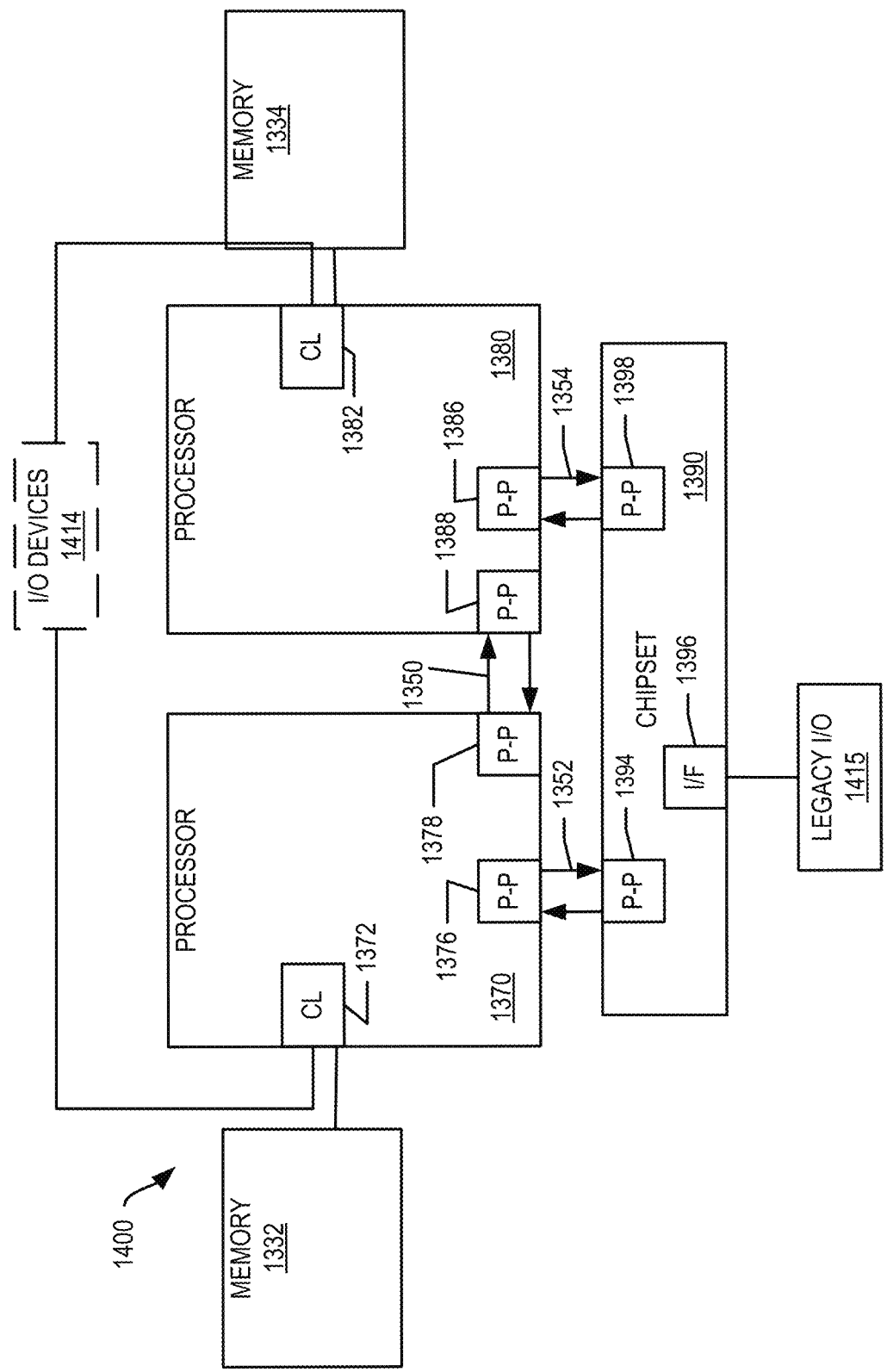
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
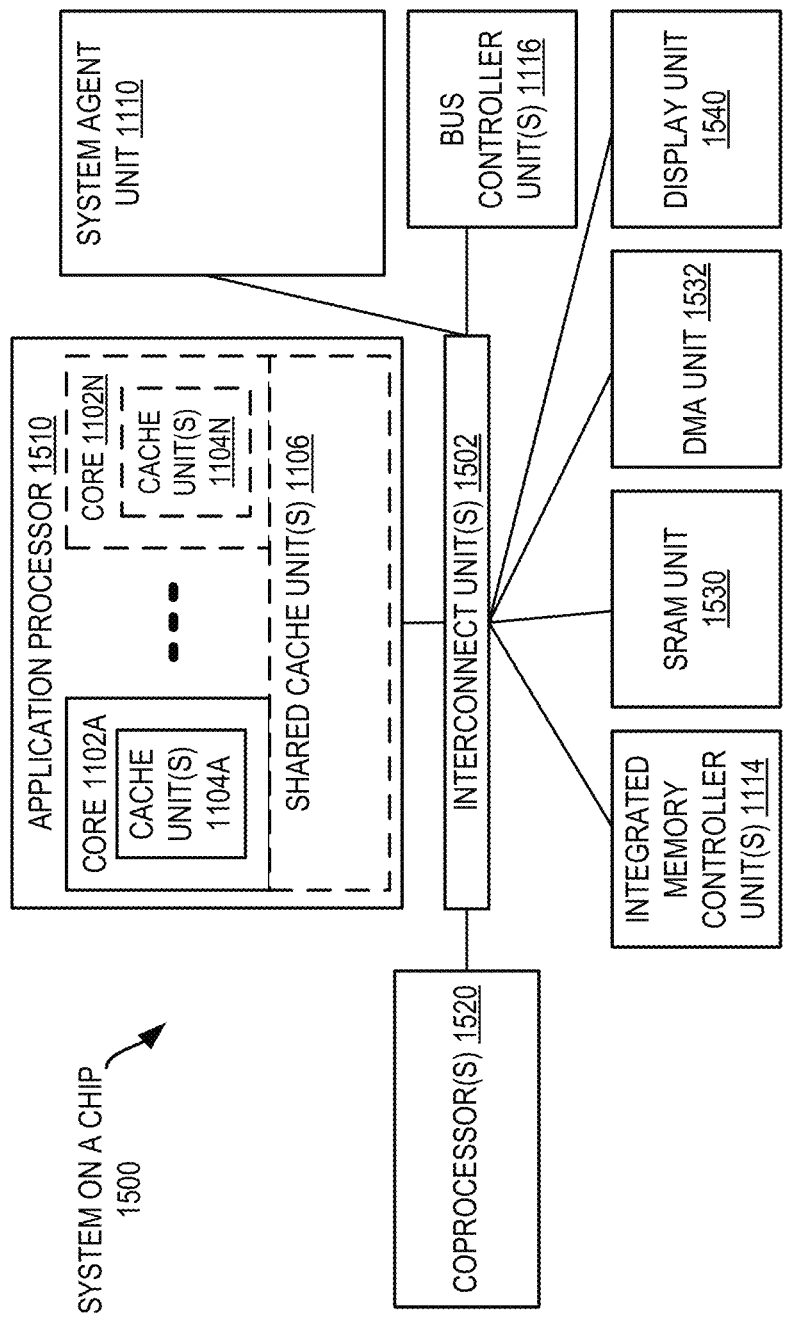
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
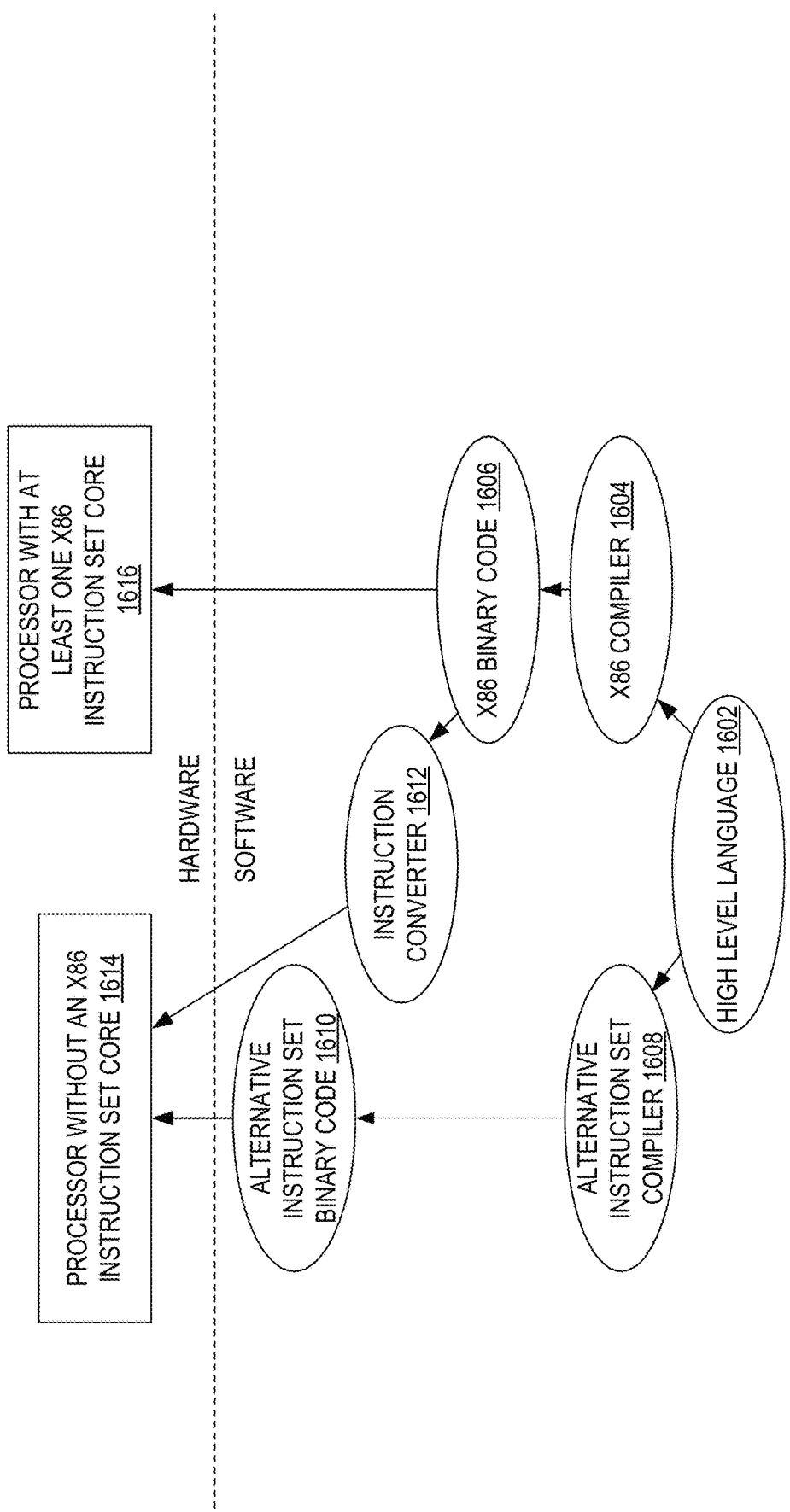
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high-level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high-level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation, or any other process, allows a processor or other electronic device that does not have an x86 instruction set processor or core to execute the x86 binary code 1606.

What is claimed is:

1. An apparatus comprising:
   an execution circuit to execute instructions;
   a retirement circuit to retire executed instructions;
   a status register; and
   a last branch record circuit to:
      in response to retirement by the retirement circuit of a first taken branch instruction, start a cycle timer and a performance monitoring event counter that is distinct from the cycle timer, and
      in response to retirement by the retirement circuit of a second taken branch instruction, that is a next taken branch instruction in program order after the first taken branch instruction, write values from the cycle timer and the performance monitoring event counter into a first entry in the status register and clear the values from the cycle timer and the performance monitoring event counter.

2. The apparatus of claim 1, wherein the last branch record circuit is to:
   in response to retirement by the retirement circuit of the second taken branch instruction, start the cycle timer and the performance monitoring event counter after the clear, and
   in response to retirement by the retirement circuit of a third taken branch instruction, that is a next taken branch instruction in program order after the second taken branch instruction, write values from the cycle timer and the performance monitoring event counter into a second entry in the status register and clear the values from the cycle timer and the performance monitoring event counter.

3. The apparatus of claim 1, further comprising a cache, wherein the last branch record circuit is to update a first counter of the performance monitoring event counter for a hit in the cache for an instruction between the first taken branch instruction and the second taken branch instruction in program order.

4. The apparatus of claim 3, further comprising a translation lookaside buffer, wherein the last branch record circuit is to update a second counter of the performance monitoring event counter for a miss in the translation lookaside buffer for an instruction between the first taken branch instruction and the second taken branch instruction in program order.

5. The apparatus of claim 1, wherein the execution circuit is to, in response to execution of a capabilities instruction, load a value into a register of the apparatus that indicates a number of counters of the performance monitoring event counter.

6. The apparatus of claim 1, wherein the performance monitoring event counter comprises a plurality of counters for different performance monitoring events, and, in response to retirement by the retirement circuit of the second taken branch instruction, the last branch record circuit is further to write an instruction pointer of the first taken branch instruction and an instruction pointer of a target address of the first taken branch instruction into the first entry of the status register with the values of the plurality of counters.

7. The apparatus of claim 1, wherein, in response to retirement by the retirement circuit of the second taken branch instruction, the last branch record circuit is further to write an instruction pointer of the first taken branch instruction and an instruction pointer of a target address of the first taken branch instruction into the first entry of the status register.

8. The apparatus of claim 1, further comprising a command register comprising a plurality of bits, wherein the performance monitoring event counter comprises a plurality of counters for different performance monitoring events, and, when a corresponding bit is set in the command register, enables the performance monitoring event counter to count a corresponding performance monitoring event.

9. A method comprising:
executing instructions with an execution circuit of a processor core;
retiring executed instructions with a retirement circuit of the processor core;
in response to retirement by the retirement circuit of a first taken branch instruction, starting a cycle timer and a performance monitoring event counter, that is distinct from the cycle timer, by a last branch record circuit of the processor core; and
in response to retirement by the retirement circuit of a second taken branch instruction, that is a next taken branch instruction in program order after the first taken branch instruction, writing values from the cycle timer and the performance monitoring event counter into a first entry in a status register of the processor core and clearing the values from the cycle timer and the performance monitoring event counter by the last branch record circuit.

10. The method of claim 9, further comprising:
in response to retirement by the retirement circuit of the second taken branch instruction, starting the cycle timer and the performance monitoring event counter by the last branch record circuit after the clearing; and
in response to retirement by the retirement circuit of a third taken branch instruction, that is a next taken branch instruction in program order after the second taken branch instruction, writing values from the cycle timer and the performance monitoring event counter into a second entry in the status register and clearing the values from the cycle timer and the performance monitoring event counter by the last branch record circuit.

11. The method of claim 9, further comprising updating a first counter of the performance monitoring event counter for a hit in a cache of the processor core for an instruction between the first taken branch instruction and the second taken branch instruction in program order by the last branch record circuit.

12. The method of claim 11, further comprising updating a second counter of the performance monitoring event counter for a miss in a translation lookaside buffer of the processor core for an instruction between the first taken branch instruction and the second taken branch instruction in program order by the last branch record circuit.

13. The method of claim 9, further comprising executing a capabilities instruction with the execution circuit to load a value into a register of the processor core that indicates a number of counters of the performance monitoring event counter.

14. The method of claim 9, wherein the performance monitoring event counter comprises a plurality of counters for different performance monitoring events, and, in response to retirement by the retirement circuit of the second taken branch instruction, the method further comprising writing an instruction pointer of the first taken branch instruction and an instruction pointer of a target address of the first taken branch instruction into the first entry of the status register with the values of the plurality of counters by the last branch record circuit.

15. The method of claim 9, wherein, in response to retirement by the retirement circuit of the second taken branch instruction, further comprising writing an instruction pointer of the first taken branch instruction and an instruction pointer of a target address of the first taken branch instruction into the first entry of the status register by the last branch record circuit.

16. The method of claim 9, wherein the performance monitoring event counter comprises a plurality of counters for different performance monitoring events, and the method further comprises, when a corresponding bit is set in a plurality of bits of a command register of the processor core, enabling the performance monitoring event counter to count a corresponding performance monitoring event.

17. An apparatus comprising:
an execution circuit to execute instructions;
a status register; and
a last branch record circuit to:
in response to a first taken branch instruction, start a cycle timer and a performance monitoring event counter that is distinct from the cycle timer, and
in response to a second taken branch instruction, that is a next taken branch instruction in program order after the first taken branch instruction, write values from the cycle timer and the performance monitoring event counter into a first entry in the status register and clear the values from the cycle timer and the performance monitoring event counter.

18. The apparatus of claim 17, wherein the last branch record circuit is to:
in response to the second taken branch instruction, start the cycle timer and the performance monitoring event counter after the clear, and
in response to a third taken branch instruction, that is a next taken branch instruction in program order after the second taken branch instruction, write values from the cycle timer and the performance monitoring event counter into a second entry in the status register and clear the values from the cycle timer and the performance monitoring event counter.

19. The apparatus of claim 17, further comprising a cache, wherein the last branch record circuit is to update a first counter of the performance monitoring event counter for a hit in the cache for an instruction between the first taken branch instruction and the second taken branch instruction in program order.

20. The apparatus of claim 19, further comprising a translation lookaside buffer, wherein the last branch record circuit is to update a second counter of the performance monitoring event counter for a miss in the translation lookaside buffer for an instruction between the first taken branch instruction and the second taken branch instruction in program order.

21. The apparatus of claim 17, wherein the execution circuit is to, in response to execution of a capabilities instruction, load a value into a register of the apparatus that indicates a number of counters of the performance monitoring event counter.

22. The apparatus of claim 17, wherein the performance monitoring event counter comprises a plurality of counters for different performance monitoring events, and, in response to the second taken branch instruction, the last branch record circuit is further to write an instruction pointer of the first taken branch instruction and an instruction pointer of a target address of the first taken branch instruction into the first entry of the status register with the values of the plurality of counters.

23. The apparatus of claim 17, wherein, in response to the second taken branch instruction, the last branch record circuit is further to write an instruction pointer of the first taken branch instruction and an instruction pointer of a target address of the first taken branch instruction into the first entry of the status register.

24. The apparatus of claim 17, further comprising a command register comprising a plurality of bits, wherein the performance monitoring event counter comprises a plurality of counters for different performance monitoring events, and, when a corresponding bit is set in the command register, enables the performance monitoring event counter to count a corresponding performance monitoring event.

* * * * *